US009697848B2

(12) United States Patent
Matsumoto

(10) Patent No.: US 9,697,848 B2
(45) Date of Patent: Jul. 4, 2017

(54) NOISE SUPPRESSION DEVICE AND METHOD OF NOISE SUPPRESSION

(71) Applicant: FUJITSU LIMITED, Kawasaki-shi, Kanagawa (JP)

(72) Inventor: Chikako Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/138,440

(22) Filed: Apr. 26, 2016

(65) Prior Publication Data

US 2016/0379614 A1 Dec. 29, 2016

(30) Foreign Application Priority Data

Jun. 26, 2015 (JP) ................................ 2015-129112

(51) Int. Cl.
*H04B 15/00* (2006.01)
*G10L 21/0232* (2013.01)
*G10L 21/0216* (2013.01)

(52) U.S. Cl.
CPC *G10L 21/0232* (2013.01); *G10L 2021/02165* (2013.01); *G10L 2021/02166* (2013.01)

(58) Field of Classification Search
CPC .. G10K 11/16; G10L 21/0208; G10L 21/0232
See application file for complete search history.

(56) References Cited

U.S. PATENT DOCUMENTS 8,898,058 B2 * 11/2014 Shin ........................ G10L 25/78 704/205
2010/0323652 A1 * 12/2010 Visser .................... H04R 3/005 455/232.1
2012/0035920 A1 * 2/2012 Hayakawa .......... G10L 21/0208 704/226
2012/0134509 A1 * 5/2012 Matsumoto ......... G10L 21/0208 381/94.3
2012/0197638 A1 8/2012 Li et al.
2013/0166286 A1 * 6/2013 Matsumoto ............. G10L 21/02 704/205
2013/0188799 A1 * 7/2013 Otani ....................... H04B 3/20 381/66

FOREIGN PATENT DOCUMENTS

| | | |
|---|---|---|
| JP | 2008-309955 | 12/2008 |
| JP | 2011-186384 | 9/2011 |
| JP | 2013-511750 | 4/2013 |
| JP | 2013-120358 | 6/2013 |

* cited by examiner

*Primary Examiner* — Simon King
(74) *Attorney, Agent, or Firm* — Fujitsu Patent Center

(57) ABSTRACT

A noise suppression device includes a memory, and a processor coupled to the memory and configured to generate a first input signal and a second input signal by converting a first sound signal and a second sound signal from time domain to frequency domain, the first sound signal and the second sound signal being collected by a first microphone and a second microphone, respectively, based on the first input signal and the second input signal, determine a stationary noise model, calculate a signal to noise ratio (SNR) based on the first input signal and the stationary noise model, based on the SNR ratio, set a range of phase difference to suppress the first input signal, calculate a phase difference between the first input signal and the second input signal, and when the phase difference is within the range of phase difference, suppress the first input signal.

18 Claims, 23 Drawing Sheets

FIG. 4A

| BAND NUMBER | PHASE DIFFERENCE RANGE TO BE SUPPRESSED |
|---|---|
| 0 | dP1(0)≦dP(0)<dP2(0), dP3(0)≦dP(0)<dP4(0) |
| 1 | dP1(1)≦dP(1)<dP2(1), dP3(1)≦dP(1)<dP4(1) |
| 2 | dP1(2)≦dP(2)<dP2(2), dP3(2)≦dP(2)<dP4(2) |
| ⋮ | ⋮ |
| 127 | dP1(127)≦dP(127)<dP2(127), dP3(127)≦dP(127)<dP4(127) |

FIG. 4B

| BAND NUMBER | PHASE DIFFERENCE RANGE TO BE SUPPRESSED |
|---|---|
| 0 | dP1(0)≦dP(0)<dP5(0), dP6(0)≦dP(0)<dP4(0) |
| 1 | dP1(1)≦dP(1)<dP5(1), dP6(1)≦dP(1)<dP4(1) |
| 2 | dP1(2)≦dP(2)<dP5(2), dP6(2)≦dP(2)<dP4(2) |
| ⋮ | ⋮ |
| 127 | dP1(127)≦dP(127)<dP5(127), dP6(127)≦dP(127)<dP4(127) |

NOISE SUPPRESSION DEVICE AND METHOD OF NOISE SUPPRESSION

CROSS-REFERENCE TO RELATED APPLICATION

This application is based upon and claims the benefit of priority of the prior Japanese Patent Application No. 2015-129112, filed on Jun. 26, 2015, the entire contents of which are incorporated herein by reference.

FIELD

The embodiments discussed herein are related to a noise suppression device and a method of noise suppression.

BACKGROUND

In a mobile phone, a video conference system, a broadcasting system, or the like, various techniques are known in order to suppress noise included in a sound signal collected by a microphone, or the like (hereinafter also referred to simply as a "microphone"). As noise included in a sound signal, there is, for example, an engine sound of a vehicle that passes by the vicinity of a microphone, an operation sound (stationary noise) of a fan and a motor that are installed in a factory, and the like.

The best known technique, as one of the techniques for suppressing noise, is a technique that suppresses noise by a plurality of sound signals collected using a microphone array including a plurality of microphones. As one of the noise suppression techniques of this kind, a microphone array noise reduction control method is known in which spatial orientation information of sound is directly captured by a microphone array, and update filtering by an adaptive filter is more correctly controlled using the orientation information.

Also, as a noise suppression technique using a microphone array, a technique for suppressing noise based on the phase difference of a plurality of sound signals collected by a microphone array is known, in addition.

Also, as one of related noise suppression techniques, a technique is known for suppressing noise by performing filter processing using a Kalman filter on the sound data in frequency domain, which has been obtained using Fourier transformation. Further, as another related noise suppression technique, a technique is known in which the variation width of an amplitude spectrum is restricted in accordance with the variation direction of the amplitude spectrum obtained by the time-to-frequency transformation, and noise is estimated based on this in order to perform noise suppression.

As examples of related-art techniques, Japanese National Publication of International Patent Application No. 2013-511750, Japanese Laid-open Patent Publication No. 2011-186384, Japanese Laid-open Patent Publication No. 2013-120358, and Japanese Laid-open Patent Publication No. 2008-309955 are known.

SUMMARY

According to an aspect of the invention, a noise suppression device includes a memory, and a processor coupled to the memory and configured to generate a first input signal and a second input signal by converting a first sound signal and a second sound signal from time domain to frequency domain, the first sound signal and the second sound signal being collected by a first microphone and a second microphone, respectively, based on the first input signal and the second input signal, determine a stationary noise model, calculate a signal to noise ratio (SNR) based on the first input signal and the stationary noise model, based on the SNR ratio, set a range of phase difference to suppress the first input signal, calculate a phase difference between the first input signal and the second input signal, and when the phase difference is within the range of phase difference, suppress the first input signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A illustrates an example of a first suppression phase difference range table.

FIG. 4B illustrates an example of a second suppression phase difference range table.

DESCRIPTION OF EMBODIMENTS

In the above-described noise suppression techniques, if noise included in a sound signal is large and the signal to noise ratio (Signal Noise Ratio, hereinafter also referred to as an "SNR") is low, sound is suppressed, and thus it becomes difficult to catch the sound.

Reference Example

Figure 1A:
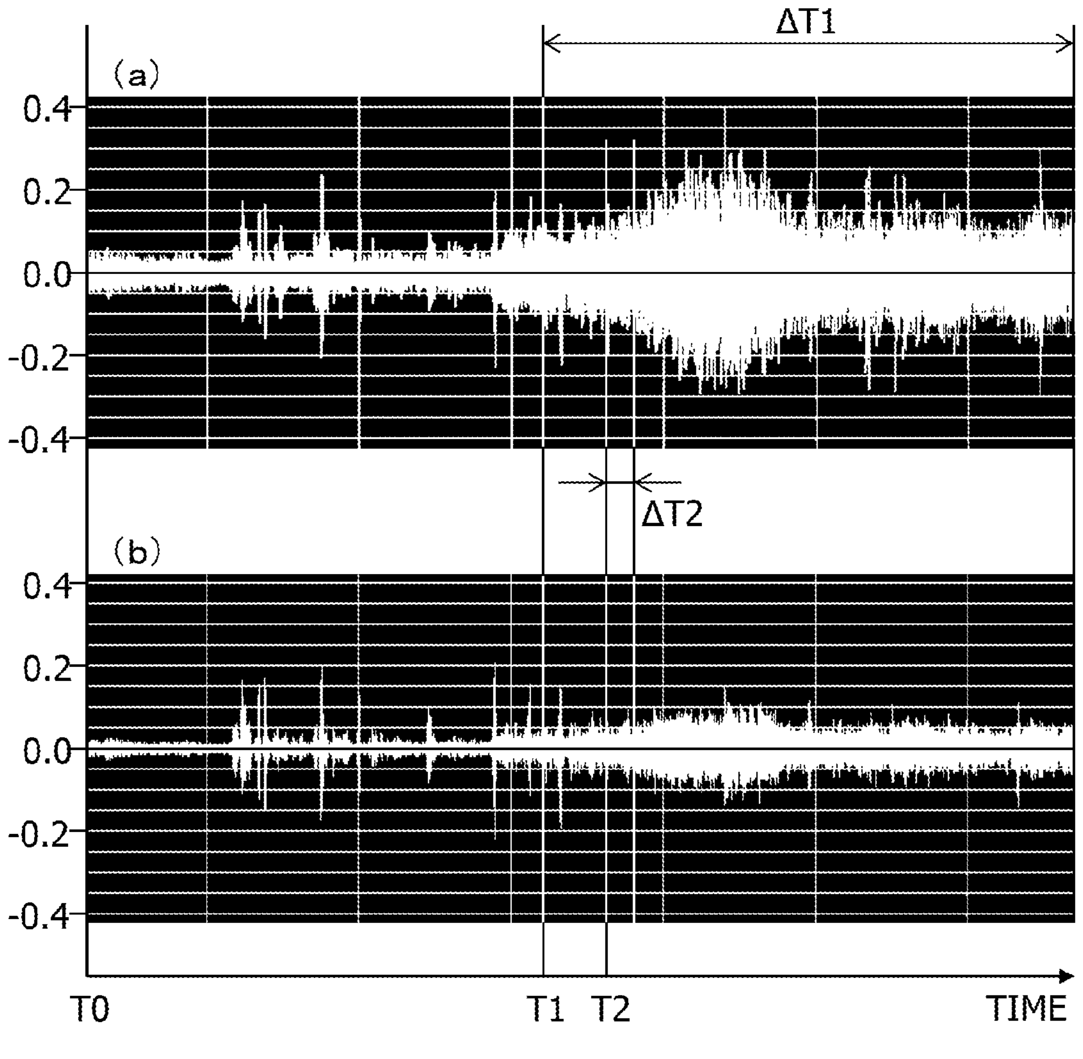
FIG. 1A is a waveform chart for explaining a reference example of noise suppression processing.
Figure 1B:
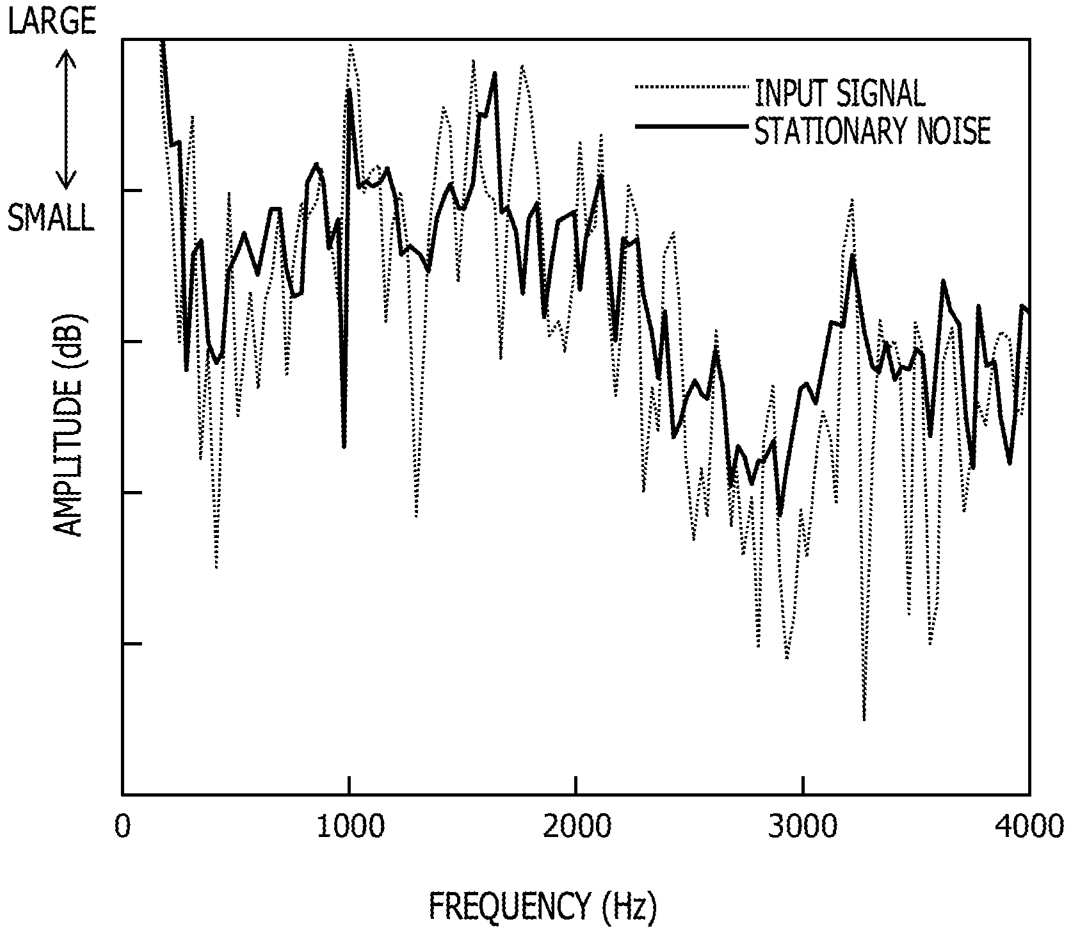
FIG. 1B illustrates an example of a frequency spectrum when noise included in an input signal is large.
Figure 1C:
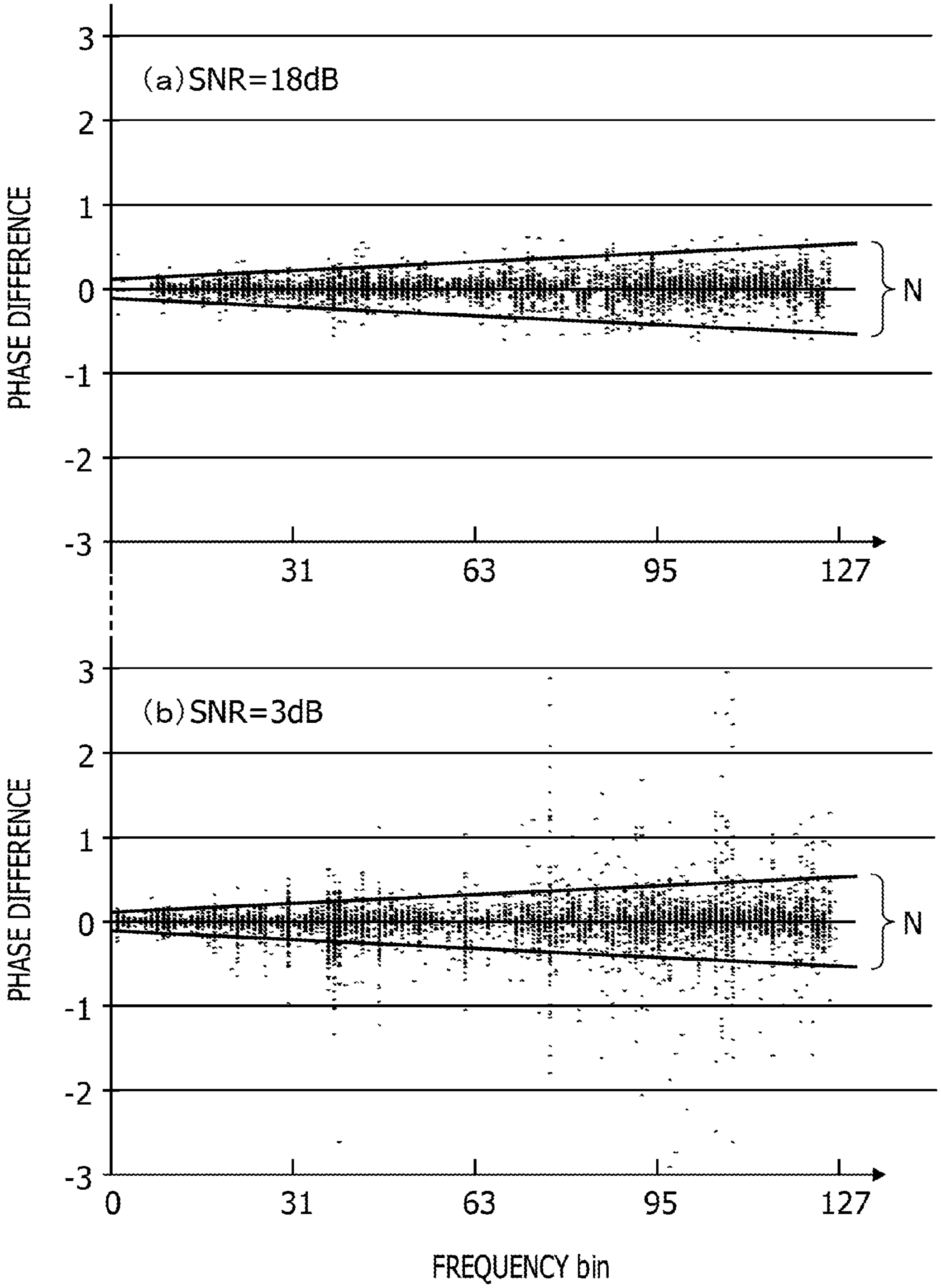
FIG. 1C is a diagram for explaining a relationship between SNR and phase difference.

FIG. 1A is a waveform chart for explaining a reference example of noise suppression processing. FIG. 1B illustrates an example of a frequency spectrum when noise included in an input signal is large. FIG. 1C is a diagram for explaining a relationship between SNR and phase difference.

In (a) in FIG. 1A illustrates a waveform of one input signal of a plurality of input signals collected by a microphone array. In a section ΔT1 after time T1 in the waveform illustrated in (a) in FIG. 1A, noise volume is larger than the speech sound volume, and thus the speech sound is buried in noise. Here, the speech sound in the input signal denotes a significant sound to become a main purpose of collecting sound, such as a voice emitted by a speaker, or the like. Also, noise denotes sound of unwanted components in the input collection signal, such as an engine sound of a vehicle that passes by the vicinity of the microphone, an operation sound, or the like of a fan and a motor that are installed in a factory, and the like.

When noise suppression processing is performed on an input signal as illustrated in (a) in FIG. 1A based on the phase difference of a plurality of input signals, for example, a waveform as illustrated in (b) in FIG. 1A is obtained. In the signal having a waveform as illustrated in (b) in FIG. 1A, speech sound is mistakenly suppressed in the large noise section ΔT1. Accordingly, if the waveform as illustrated in (b) in FIG. 1A is played back, it is difficult to listen to the speech sound. In this manner, the situation in which sound is mistakenly suppressed tends to occur, for example, when noise is large and SNR is low, and there is a frequency band in which the input signal becomes smaller than a stationary noise.

When a frequency spectrum for a section ΔT2 in the section ΔT1 having large noise in the input signal illustrated in (a) in FIG. 1A is obtained, for example, a distribution as illustrated by a dotted line in FIG. 1B is produced. Also, when stationary noise in the section ΔT2 is illustrated so as to be overlapped on FIG. 1B, a distribution as illustrated by a bold solid line is produced.

In the example illustrated in FIG. 1B, for example, the amplitude about 500 Hz in the input signal, that is to say, the amplitude of the average frequency band of a human voice is smaller than the amplitude of stationary noise. Accordingly, in the noise suppression processing on the input signal in the section ΔT2, a sound is suppressed as noise, and thus it becomes difficult to catch the sound.

Also, when a sound is uttered from the position at the same distance away from two microphone, in an environment in which SNR is high, as illustrated in (a) in FIG. 1C, the phase difference of each frequency bin (frequency band) does not deviate from 0 greatly, and almost all components of the phase difference are within the range of ±1. In contrast, in an environment in which SNR is low, as illustrated in (b) in FIG. 1C, particularly in a high-frequency band, disorder of the phase difference due to the influence of noise becomes large. Accordingly, in the related-art noise suppression method, for example, as illustrated in FIG. 1C, a phase difference range N having the phase difference 0 as center is set, and the signal components having a frequency band outside the phase difference range N are suppressed in order to suppress noise.

However, if the phase difference range N is fixed although the distribution of the phase difference is changed by SNR, in the environment, in which SNR is low as illustrated in (b) in FIG. 1C, a large number of signal components are suppressed. Accordingly, a sound signal of frequency band with large disorder in the phase difference is suppressed as noise, and thus it sometimes becomes difficult to catch the sound. That is to say, if noise suppression processing is executed based on the phase difference, when a vehicle passes by in the vicinity, or stationary noise, such as a fan or a motor of a factory, or the like is large, and the SNR of the input signal is low, the sound signal is suppressed, and thus the sound sometimes becomes difficult to catch.

[First Embodiment]

Figure 2:
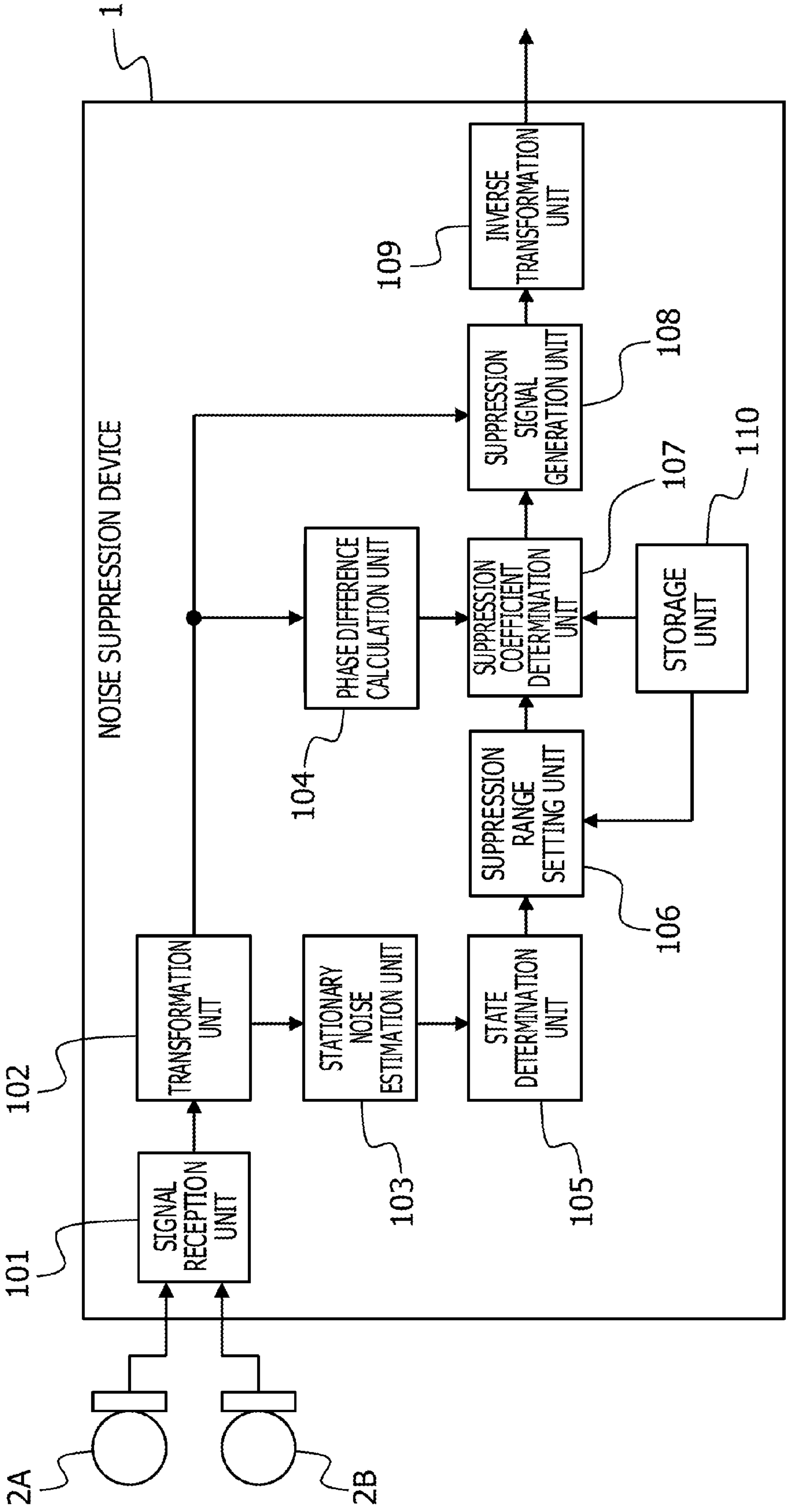
FIG. 2 illustrates a functional configuration of a noise suppression device according to a first embodiment.

FIG. 2 illustrates a functional configuration of a noise suppression device according to a first embodiment.

As illustrated in FIG. 2, a noise suppression device 1 according to the present embodiment includes a signal reception unit 101, a transformation unit 102, a stationary noise estimation unit 103, a phase difference calculation unit 104, a state determination unit 105, a suppression range setting unit 106, and a suppression coefficient determination unit 107. Also, the noise suppression device 1 further includes a suppression signal generation unit 108, an inverse transformation unit 109, and a storage unit 110.

The signal reception unit 101 receives input of a first input signal collected by a first microphone 2A and a second input signal collected by a second microphone 2B.

The transformation unit 102 transforms the first input signal and the second input signal from the signals in time domain into signals in frequency domain. Hereinafter the first input signal and the second input signal transformed into frequency domain by the transformation unit 102 are referred to as a first sound signal and a second sound signal, respectively.

The stationary noise estimation unit 103 estimates stationary noise models of the first sound signal and the second sound signal.

The phase difference calculation unit 104 calculates the phase difference of each frequency band based on the first sound signal and the second sound signal.

The state determination unit 105 determines the state of the first sound signal based on the first sound signal and the stationary noise model. The state determination unit 105 according to the present embodiment determines whether or not the first sound signal is in a low SNR state. The state determination unit 105 calculates an SNR based on the first sound signal and the stationary noise model, and if the calculated SNR is lower than or equal to a predetermined threshold value, the state determination unit 105 determines that the first sound signal is in a low SNR state.

The suppression range setting unit 106 sets the phase difference range in which each frequency band is suppressed in accordance with the determination result (whether or not a low SNR) by the state determination unit 105. In the present embodiment, two suppression phase difference range tables having different phase difference ranges where the input signal is suppressed are provided in advance, and a determination is made of which of the suppression range tables is used in accordance with the SNR.

The suppression coefficient determination unit 107 determines a suppression coefficient to be applied to each frequency band of the first sound signal based on the phase difference calculated by the phase difference calculation unit 104 and the suppression range (the phase difference range where the input signal is suppressed) set by the suppression range setting unit 106.

The suppression signal generation unit 108 multiplies each frequency band of the first sound signal by the suppression coefficient determined by suppression coefficient determination unit 107 to generate a suppression signal.

The inverse transformation unit 109 transforms the suppression signal that is generated from the first sound signal from the signal in frequency domain into a signal in time domain to generate an output sound signal.

The storage unit 110 stores the first suppression phase difference range table and the second suppression phase difference range table, or the like.

Figure 3:
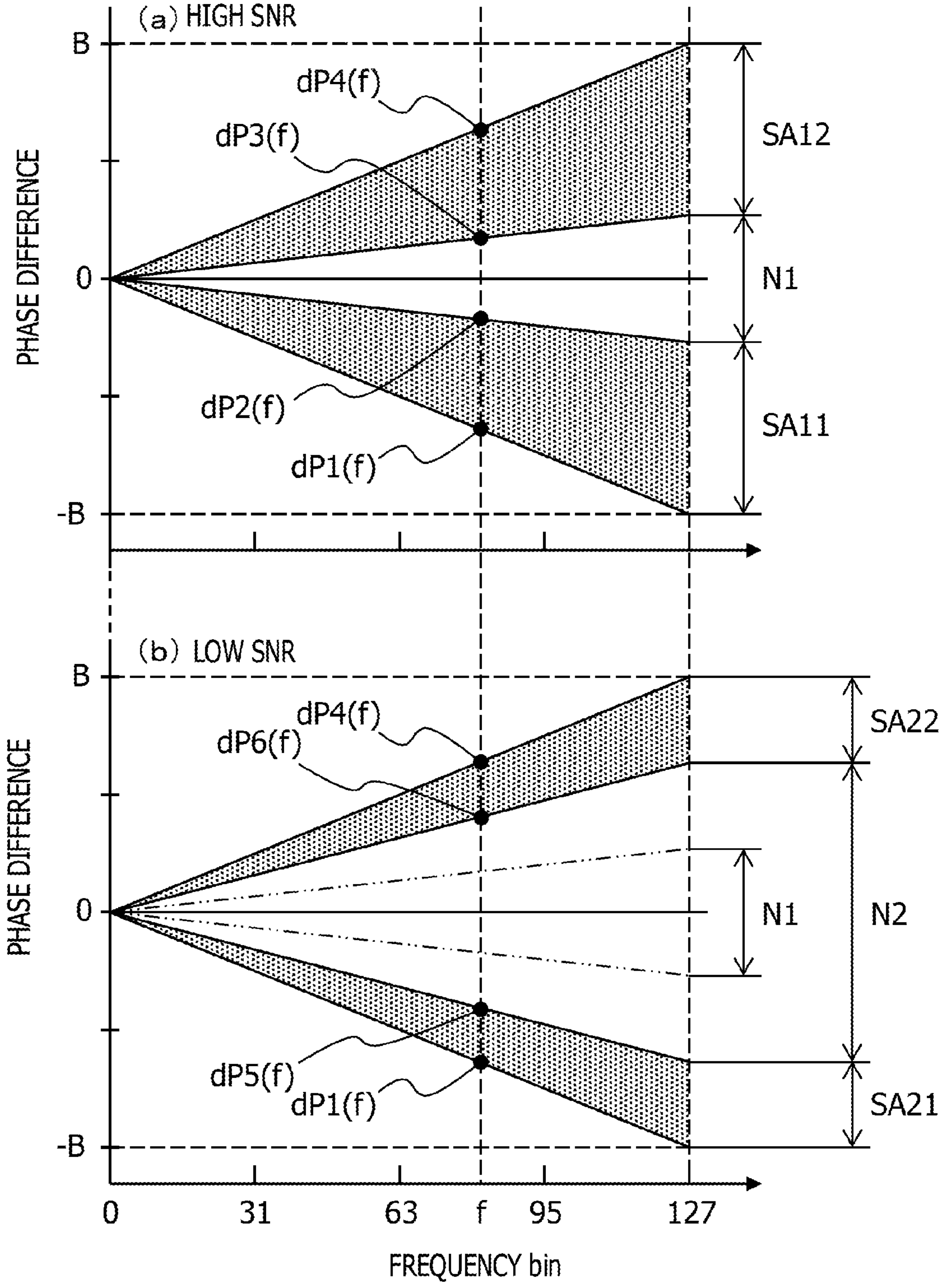
FIG. 3 illustrates a relationship between SNR and phase difference range where the input signal is suppressed.

FIG. 3 illustrates a relationship between SNR and a phase difference range where the input signal is suppressed. FIG. 4A illustrates an example of the first suppression phase difference range table. FIG. 4B illustrates an example of the second suppression phase difference range table.

In the noise suppression device 1 according to the present embodiment, for example, the first sound signal and the second sound signal are divided for each predetermined frequency band (for example, for each 31.25 Hz), and a suppression coefficient β for suppressing noise is determined based on the phase difference for each frequency band.

It is assumed that if the phase difference is within a predetermined range, the suppression coefficient β is "1", and if the phase difference is out of the range, the suppression coefficient β is a predetermined value less than 1. Also, the range of the phase difference that causes suppression coefficient β to be 1 is made wider as the frequency band becomes greater. Further, in the above-described embodiment, as described above, the range of the phase difference where the input signal is suppressed is changed in accordance with SNR.

If SNR is equal to or higher than a predetermined threshold value (in the case of high SNR), for example, as illustrated in (a) in FIG. 3, when the phase difference is in a range N1, the suppression coefficient β is set to 1, and when the phase difference is in a range SA11 or SA12, the suppression coefficient β is set to a predetermined value less than 1. That is to say, if SNR is equal to or higher than the predetermined threshold value, when the phase difference dP(f) satisfies $dP1(f) \le dP(f) < dP2(f)$ or $dP3(f) < dP(f) \le dP4(f)$, the signal component of the frequency band f is suppressed.

On the other hand, if SNR is lower than the predetermined threshold value (in the case of low SNR), for example, as illustrated in (b) in FIG. 3, a phase difference range N2 that causes the suppression coefficient β to be 1 is made wider than the phase difference range N1 in the case of high SNR. At this time, the phase difference ranges SA21 and SA22 that causes the suppression coefficient β to be a predetermined value less than 1 becomes narrower than the phase difference ranges SA11 and SA12 in the case of high SNR. That is to say, in the case of low SNR, if the phase difference dP(f) satisfies $dP1(f) \le dP(f) < dP5(f)$ or $dP6(f) < dP(f) \le dP4(f)$, the signal component of the frequency band f is suppressed (note that $dP5(f) < dP2(f)$ and $dP3(f) < dP6(f)$).

In the present embodiment, the range of the phase difference dP(f) where the input signal is suppressed is obtained for each frequency band f for each of the cases of high SNR and low SNR, and the suppression phase difference range tables as illustrated in FIG. 4A and FIG. 4B are created. In this regard, the table illustrated in FIG. 4A is an example of the first suppression phase difference range table created based on the phase difference range, illustrated in (a) FIG. 3, where the input signal is suppressed. Also, the table illustrated in FIG. 4B is an example of the second suppression phase difference range table created based on the phase difference range, illustrated in (b) FIG. 3, where the input signal is suppressed.

The phase difference ranges SA21 and SA22 where the input signal is suppressed at the time of low SNR are set to a value, for example, about ½ or ⅓ times that of the phase difference ranges SA11 and SA12 where the input signal is suppressed at the time of high SNR.

Figure 5:
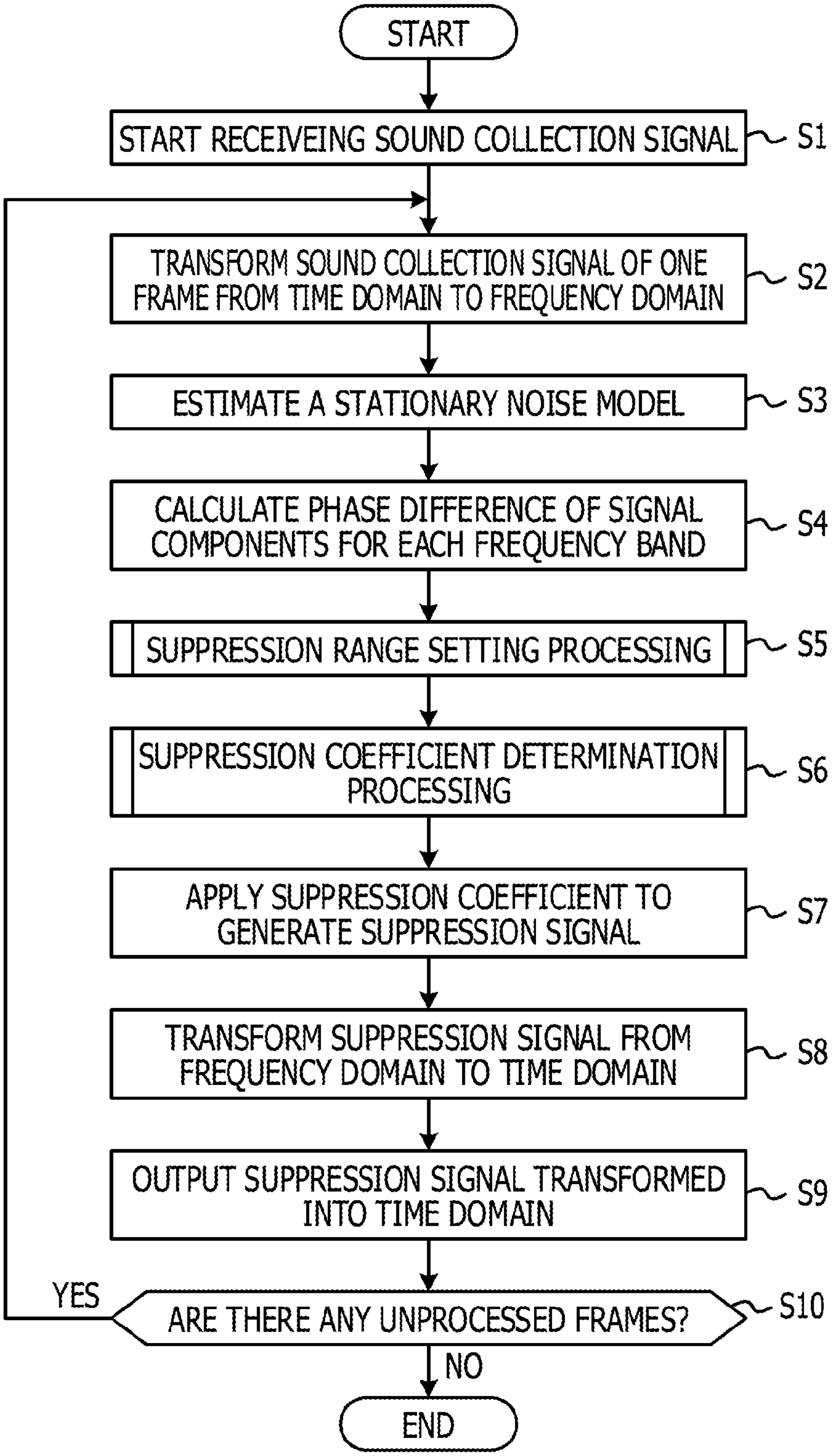
FIG. 5 is a flowchart illustrating contents of noise suppression processing.

FIG. 5 is a flowchart illustrating contents of noise suppression processing.

When sound collection by the first microphone 2A and the second microphone 2B is started, the noise suppression device 1 according to the present embodiment performs the processing as illustrated in FIG. 5.

The noise suppression device 1 first starts reception of the first input signal and the second input signal (step S1). Step S1 is performed by the signal reception unit 101. The signal reception unit 101 passes the input signal input from the first microphone 2A and the second microphone 2B to the transformation unit 102. In this regard, the signal reception unit 101 continues the processing in step S1 until the sound collection by the first microphone 2A and the second microphone 2B terminate.

Next, the transformation unit 102 transforms the input signal of one frame from time domain into frequency domain (step S2). The transformation unit 102 transforms the input signal, which is a signal in time domain, into a sound signal (frequency spectrum), which is a signal in frequency domain, for example, by Fast Fourier transformation (FFT). When the transformation unit 102 transforms each frame into frequency domain, the transformation unit 102 passes the transformed first sound signal and second sound signal to the stationary noise estimation unit 103 and the phase difference calculation unit 104. Further, the transformation unit 102 passes, for example, the transformed first sound signal to the suppression signal generation unit 108.

Next, the stationary noise estimation unit 103 estimates a stationary noise model based on the received first sound signal and second sound signal (step S3). The stationary noise estimation unit 103 estimates the stationary noise model based on the known estimation method using any one of the stationary noise models. Further, the stationary noise estimation unit 103 passes the first sound signal and the estimated stationary noise model to the state determination unit 105.

Also, when the phase difference calculation unit 104 receives the first sound signal and the second sound signal, the phase difference calculation unit 104 calculates the phase difference between the first sound signal and the second sound signal for each frequency band (step S4). The phase difference calculation unit 104 calculates the phase difference using any one of the known calculation methods.

Further, the phase difference calculation unit 104 passes the calculated phase difference to the suppression coefficient determination unit 107.

Also, when the state determination unit 105 receives the first sound signal and the estimated stationary noise model, the state determination unit 105 performs suppression range setting processing in cooperation with the suppression range setting unit 106 (step S5). The state determination unit 105 determines whether or not in the low SNR state based on the first sound signal and the estimated stationary noise model, and notifies the determination result to the suppression range setting unit 106. The suppression range setting unit 106 sets either the first suppression phase difference range table or the second suppression phase difference range table to be used based on the notified determination result. The suppression range setting unit 106 reads the set first suppression phase difference range table or second suppression phase difference range table from the storage unit 110, and passes the table to the suppression coefficient determination unit 107.

Next, the suppression coefficient determination unit 107 performs suppression coefficient determination processing that determines the suppression coefficient β(f) to be applied to each frequency band f of the first sound signal (step S6). The suppression coefficient determination unit 107 determines the suppression coefficient β(f) in accordance with the phase difference of each frequency band f, calculated by the phase difference calculation unit 104, based on the set first suppression phase difference range table or second suppression phase difference range table that has been set by the suppression range setting unit 106. Further, the suppression coefficient determination unit 107 passes the determined suppression coefficient β(f) of each frequency band f to the suppression signal generation unit 108.

When the suppression signal generation unit 108 receives the suppression coefficient β(f) of each frequency band f, the suppression signal generation unit 108 generates a suppression signal produced by applying the suppression coefficient β(f) to a signal component of each frequency band f of the first sound signal received from the transformation unit 102 (step S7). The suppression signal generation unit 108 multiplies the amplitude of each frequency band f by the suppression coefficient β(f) to generate a suppression signal. Further, the suppression signal generation unit 108 passes the generated suppression signal to the inverse transformation unit 109.

The inverse transformation unit 109 transforms the received suppression signal from frequency domain to time domain (step S8). The inverse transformation unit 109 transforms the suppression signal, which is a signal in frequency domain, into an output sound signal, which is a signal in time domain, by Inverse Fast Fourier transformation (IFFT), for example. Further, the inverse transformation unit 109 outputs the transformed output sound signal to a predetermined output destination (for example, a speaker, a memory, a terminal of the other party on the phone, or the like) (step S9).

Also, the noise suppression device 1 checks whether or not there are unprocessed frames after outputting the output sound signal (step S10). If there is an unprocessed frame (step S10; Yes), the noise suppression device 1 performs the processing of steps S2 to S9 on the input signal in sequence for each frame until sound collection by the first microphone 2A and the second microphone 2B is terminated, and there are no unprocessed frames. When there are no unprocessed frames then (step S10; No), the noise suppression device 1 terminates the noise suppression processing.

Figure 6:
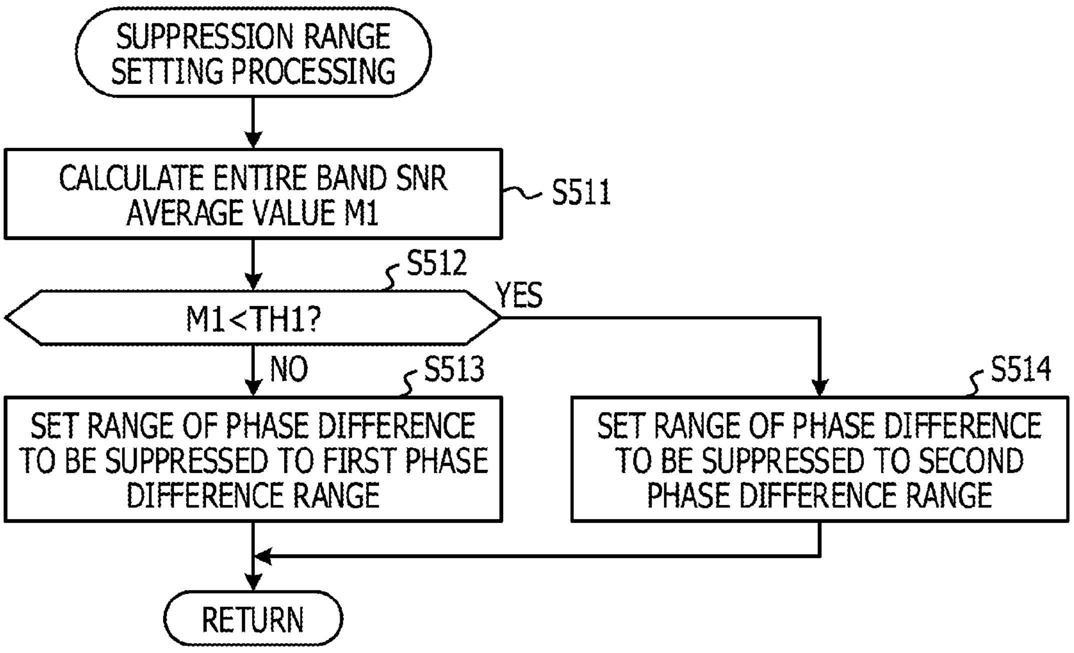
FIG. 6 is a flowchart illustrating contents of suppression range setting processing according to the first embodiment.

FIG. 6 is a flowchart illustrating contents of suppression range setting processing according to the first embodiment.

In the suppression range setting processing that is performed by the state determination unit 105 in cooperation with the suppression range setting unit 106, as illustrated in FIG. 6, first, the entire band SNR average value M1 is calculated (step S511). Step S511 is performed by the state determination unit 105. The state determination unit 105 calculates the entire band SNR average value M1 using the first sound signal and the stationary noise model by the following expression (1).

$$M1 = \frac{\sum_f (AMPLITUDEOF\ \text{SOUND SIGNAL}/AMPLITUDEOF\ \text{STATIONARYNOISE})}{(\text{FRAME LENGTH OF } FFT)} \quad (1)$$

Next, the state determination unit 105 compares the calculated entire band SNR average value M1 and the threshold value TH1 and checks whether or not M1<TH1 (step S512).

If the sound included in the sound signal is only stationary noise, the entire band SNR average value becomes a value close to 1.0. Then the entire band SNR average value when a significant sound, such as human voices, or the like is included in the sound signal becomes higher than the entire band SNR average value when the sound signal includes only stationary noise. Further, as the ratio of the stationary noise included in the sound signal becomes lower, the entire band SNR average value becomes higher. The threshold value TH1 to be used for determining whether or not the sound signal is a low SNR is therefore set to a value of about 2.0, for example.

If the entire band SNR average value M1 is equal to or higher than the threshold value TH1 (step S512; No), the state determination unit 105 determines that the first sound signal is a high SNR (not a low SNR) and notifies the determination result to the suppression range determination unit 106. In this case, the suppression range determination unit 106 determines the range of the phase difference where the input signal is suppressed to the first phase difference range based on the notified determination result (step S513). In this regard, the first phase difference range is a phase difference range where the input signal is suppressed, which is defined by the first suppression phase difference range table.

On the other hand, if the entire band SNR average value M1 is lower than the threshold value TH1 (step S512; Yes), the state determination unit 105 determines that the first sound signal is a low SNR and notifies the determination result to the suppression range determination unit 106. In this case, the suppression range determination unit 106 sets the range of the phase difference where the input signal is suppressed to the second phase difference range based on the notified determination result (step S514). In this regard, the second phase difference range is a phase difference range where the input signal is suppressed, which is defined by the second suppression phase difference range table.

Also, when the suppression range setting unit 106 sets the phase difference range where the input signal is suppressed in step S513 or S514, the suppression range setting unit 106 reads the suppression phase difference range table corresponding to the set phase difference range from the storage unit 110 and passes the table to the suppression coefficient determination unit 107. Thereby, the suppression range setting processing for one frame is terminated (return).

Figure 7:
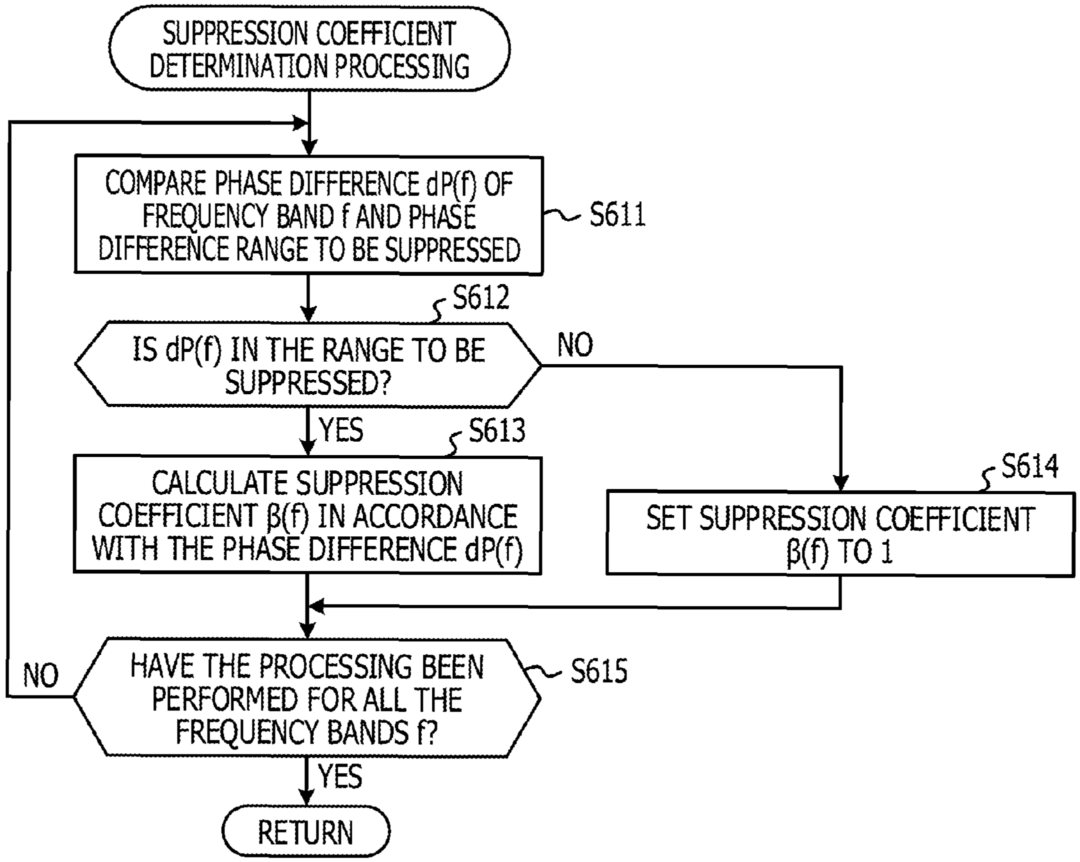
FIG. 7 is a flowchart illustrating contents of suppression coefficient determination processing according to the first embodiment.

FIG. 7 is a flowchart illustrating contents of suppression coefficient determination processing according to the first embodiment.

In the suppression coefficient determination processing performed by the suppression coefficient determination unit 107, as illustrated in FIG. 7, first, the phase difference dP(f) of the frequency band f and the phase difference range where the input signal is suppressed are compared (step S611), and whether or not the phase difference dP(f) is within the range t where the input signal is suppressed is checked (step S612).

If the phase difference dP(f) is within the range where the input signal is suppressed (step S612; Yes), the suppression coefficient determination unit 107 calculates a suppression coefficient β(f) corresponding to the phase difference dP(f) (step S613). The suppression coefficient β(f) corresponding to the phase difference dP(f) is calculated by a known method. For example, the suppression coefficient β(f) in the case of within the phase difference range where the input signal is suppressed is set to a fixed value less than 1 (for example, 0.5, or the like) regardless of the phase difference. Also, for example, the suppression coefficient β(f) in the case of within the phase difference range where the input signal is suppressed may be set to have an inversely proportional relationship with the absolute value of the phase difference dP(f).

On the other hand, if the phase difference dP(f) is not within the range where the input signal is suppressed (step S612; No), the suppression coefficient determination unit 107 sets the suppression coefficient β(f) to "1" regardless of the phase difference dP(f) (step S614).

After that, the suppression coefficient determination unit 107 checks whether or not the determination processing of the suppression coefficient β(f) has been performed for all the frequency bands f (step S615). If there is an unprocessed frequency band f (step S615; No), the suppression coefficient determination unit 107 repeats the processing from steps S611 to S614 for all the unprocessed frequency bands f. Then if the processing has been performed for all the frequency bands f (step S615; Yes), the suppression coefficient determination unit 107 passes the suppression coefficient β(f) of the determined each frequency band f to the suppression signal generation unit 108, and terminates the suppression coefficient calculation processing for one frame (return).

In this manner, in the noise suppression processing according to the present embodiment, the phase difference range where the input signal is suppressed is changed in accordance with the SNR of the input sound signal. Specifically, when the SNR is low, the phase difference range where the input signal is not suppressed is widened than that of when the SNR is high, and the phase difference range where the input signal is suppressed is narrowed. In this manner, the phase difference range where the input signal is not suppressed of the input sound signal is widened so that the amount of suppression of the significant sound in a low SNR section is reduced. Accordingly, in the output sound signal suppressed by the noise suppression device 1 according to the present embodiment, it becomes easy to catch sound in a low SNR section.

Figure 8:
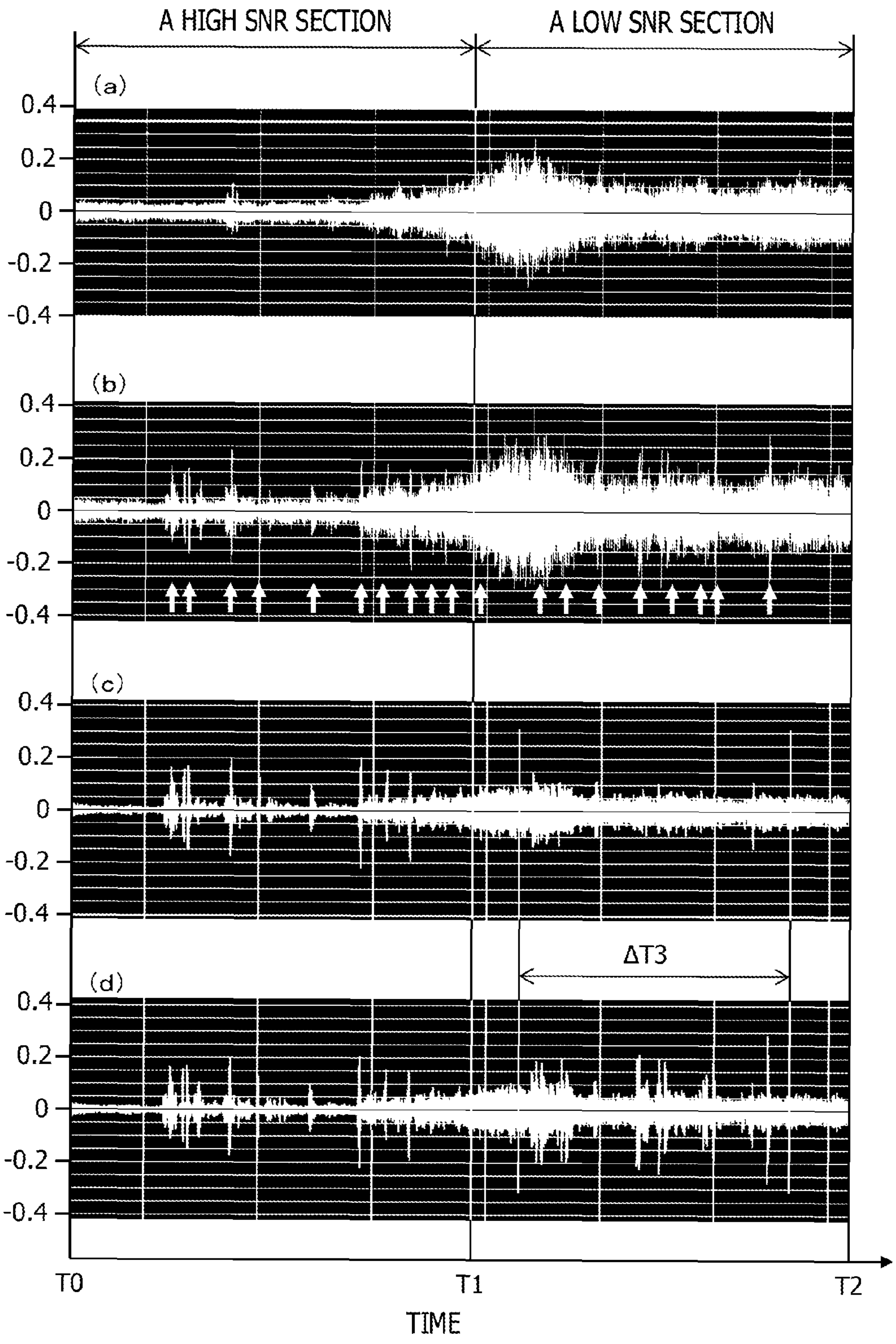
FIG. 8 is a waveform chart for comparing processing results between the noise suppression processing according to the first embodiment and a reference example.

FIG. 8 is a waveform chart for comparing processing results between the noise suppression processing according to the first embodiment and a reference example.

In this regard, in (a) in FIG. 8 is a waveform chart of noise in the input signal used for the comparison, and in (b) in FIG. 8 is a waveform chart of the input signal including noise of (a) in FIG. 8. Also, white arrows in the waveform chart in (b) in FIG. 8 indicate that there are significant speech sounds in the vicinity, respectively. Further, in the waveform charts exemplified in FIG. 8, time T0 to T1 indicates a high SNR section, and time T1 to T2 indicates a low SNR section.

If the noise suppression processing based on the phase difference is performed on the input signal of the waveform as illustrated in (b) in FIG. 8, for example, a result as illustrated in (c) in FIG. 8 is obtained. In the suppression result illustrated in (c) in FIG. 8, the amount of suppression of stationary noise became 8.3 dB, and the amount of suppression of the speech sound became 7.8 dB. On the other hand, if noise is suppressed on the input signal of the waveform as illustrated in (b) in FIG. 8 by the method described in the present embodiment, for example, a result as illustrated in (d) in FIG. 8 is obtained. In the suppression result illustrated in (d) in FIG. 8, the amount of suppression of stationary noise became 8.2 dB, and the amount of suppression of the speech sound became 2.2 dB.

Further, when a section ΔT3 in a low SNR section in (b) in FIG. 8 to (d) in FIG. 8 is viewed, in the waveform chart of (c) in FIG. 8, the speech sound is buried in noise, whereas in the waveform chart of (d) in FIG. 8, the speech sound and noise are obviously distinguished. In this manner, with the noise suppression processing according to the present embodiment, the amount of suppression of the speech sound is reduced while the amount of suppression of noise is avoided.

As described above, in the noise suppression processing according to the present embodiment, when much noise is included and the SNR is low, the phase difference range where the input signal is not suppressed is widened, and the phase difference range is narrowed so that the amount of suppression of the speech sound is reduced. Accordingly, with the present embodiment, the amount of suppression of the speech sound when the SNR is low is reduced, and thus the voice in the output sound becomes easy to catch.

In this regard, the phase difference ranges SA21 and SA22 where the input signal is suppressed at the time of low SNR may be calculated using a predetermined function in place of storing the ranges in the storage unit 110 as the second suppression phase difference range table as described above. Also, the phase difference ranges SA21 and SA22 where the input signal is suppressed at the time of low SNR, illustrated in FIG. 3, may be variable values without limiting to the fixed values described above. For example, the phase difference range SA21 where the input signal is suppressed at the time of low SNR may be calculated by SA21=(SA11/the entire band SNR average value) each time a determination is made to be a low SNR, and set.

Also, the phase difference ranges SA11 and SA12 where the input signal is suppressed at the time of high SNR, illustrated in FIG. 3, and the phase difference ranges SA21 and SA22 where the input signal is suppressed at the time of low SNR are examples of the phase difference range. For example, the phase difference ranges where the input signal is suppressed are not limited to be line symmetrical with the phase difference 0 as an axis of symmetry, as illustrated in FIG. 3, and may be asymmetrical.

[Second Embodiment]

In a second embodiment, the phase difference range where the input signal is suppressed is set in accordance with whether or not the sound signal to be suppressed is a low SNR and in a voiced state (hereinafter also referred to as a "low SNR voiced state").

Figure 9:
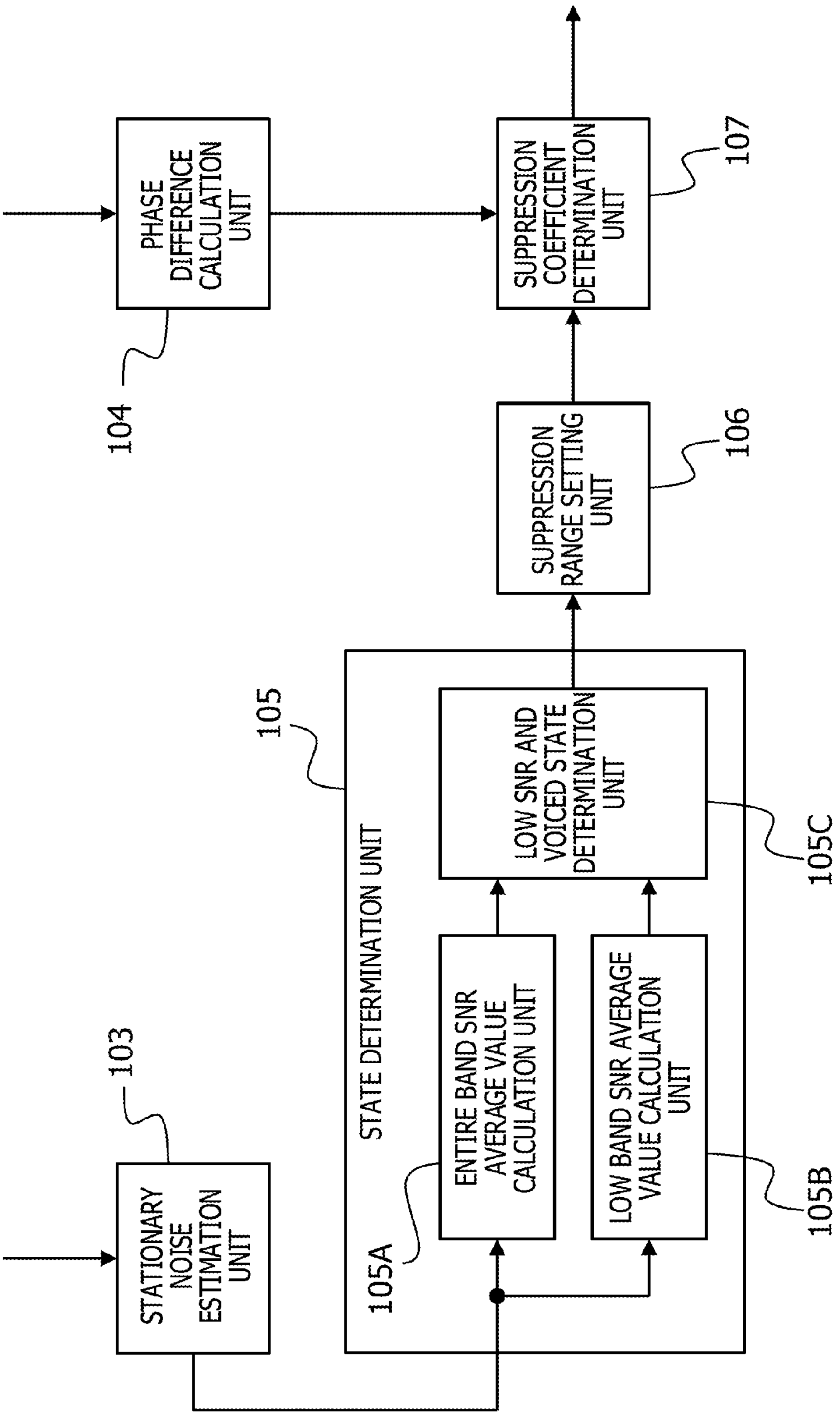
FIG. 9 illustrates a configuration of a state determination unit in a noise suppression device according to a second embodiment.

FIG. 9 illustrates a configuration of a state determination unit in a noise suppression device according to the second embodiment.

The functional configuration of a noise suppression device according to the present embodiment is the same as that of the noise suppression device 1 according to the first embodiment excluding the state determination unit 105 and the suppression range setting unit 106. The state determination unit 105 of the noise suppression device 1 according to the present embodiment includes, as illustrated in FIG. 9, an entire band SNR average value calculation unit 105A, a low frequency SNR average value calculation unit 105B, and a low SNR voiced state determination unit 105C.

The entire band SNR average value calculation unit 105A calculates the entire band SNR average value M1 described in the first embodiment.

The low frequency SNR average value calculation unit 105B calculates the average value (low frequency SNR average value) M2 of the SNR of only a frequency band having a larger amplitude than that of a stationary noise model among the frequency band lower than a predetermined frequency.

The low SNR voiced state determination unit 105C determines whether or not the sound signal to be suppressed is in a low SNR voiced state based on the entire band SNR average value M1 and the low frequency SNR average value M2. If the entire band SNR average value M1 is lower than the first threshold value TH1, and the low frequency SNR average value M2 is higher than the second threshold value TH2, the low SNR voiced state determination unit determines that the sound signal to be suppressed is in a low SNR voiced state. The low SNR voiced state determination unit 105C passes the determination result to the suppression range setting unit 106.

The suppression range setting unit 106 sets the phase difference range where the input signal is suppressed for each frequency band in accordance with the determination result (whether or not in the low SNR voiced state). In the present embodiment, two suppression phase difference range tables having different phase difference ranges where the input signal is suppressed are provided in advance in the same manner as the first embodiment, and a determination is made of which suppression phase difference range table is used based on whether or not in a low SNR voiced state.

Figure 10:
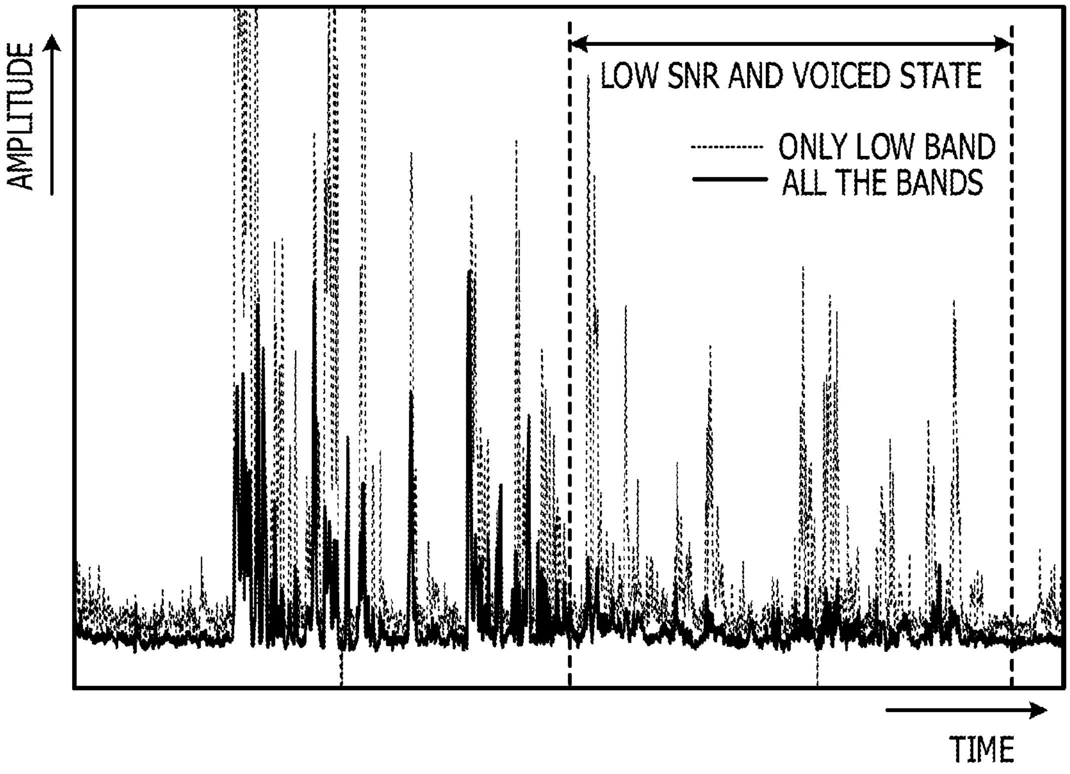
FIG. 10 is a waveform chart illustrating characteristics of a waveform in a low SNR voiced state.

Whether or not in the low SNR voiced state is determined based on the entire band SNR average value M1 and the low frequency SNR average value M2 as described above. The entire band SNR average value M1 is used for determining whether or not a low SNR, and the low frequency SNR average value M2 is used for determining whether or not in a voiced state. The low frequency SNR average value M2 is produced by calculating the average value of the SNR only by the frequency band having a larger amplitude than that of the stationary noise model among the frequency bands of less than or equal to 500 Hz, for example. Accordingly, the low frequency SNR average value M2 becomes higher than the entire band SNR average value M1. For example, the relationship between the entire band SNR average value M1 in a section in the low SNR voiced state and the low frequency SNR average value M2 becomes a relationship as illustrated in FIG. 10. FIG. 10 is a waveform chart illustrating characteristics of a waveform in a low SNR voiced state.

In the noise suppression device 1 according to the present embodiment, in the same manner as the first embodiment, when sound collection by the first microphone 2A and the second microphone 2B is started, the noise suppression processing as illustrated in FIG. 5 is performed. In this noise suppression processing, the processing other than the suppression range setting processing (step S5) performed by the cooperation of the state determination unit 105 and the suppression range setting unit 106 is the same as described in the first embodiment.

Figure 11:
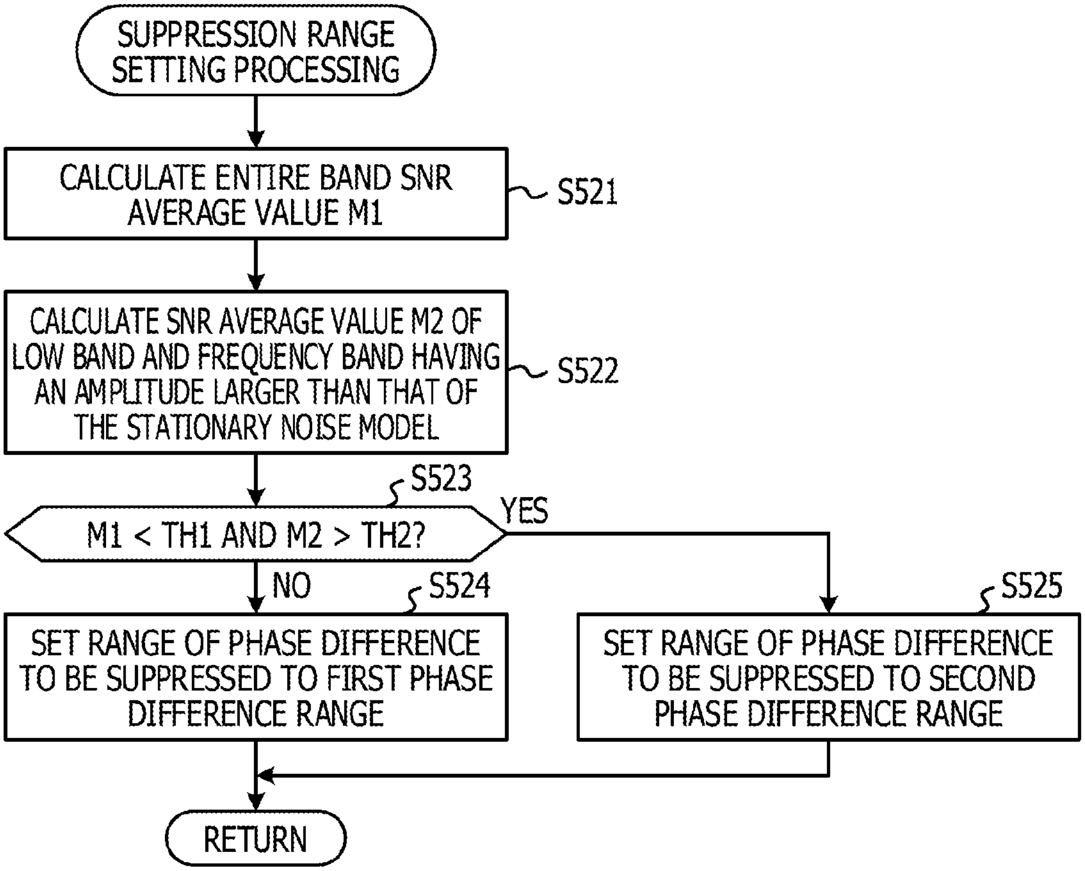
FIG. 11 is a flowchart illustrating contents of suppression range setting processing according to the second embodiment.

FIG. 11 is a flowchart illustrating contents of suppression range setting processing according to the second embodiment.

In the suppression range setting processing in the noise suppression processing according to the present embodiment, as illustrated in FIG. 11, first, the entire band SNR average value M1 is calculated (step S521). Step S521 is performed by the entire band SNR average value calculation unit 105A in the state determination unit 105. The entire band SNR average value calculation unit 105A calculates the entire band SNR average value M1 using the expression (1) and passes the calculated entire band SNR average value M1 to the low SNR voiced state determination unit 105C.

Also, the state determination unit 105 calculates a low frequency SNR average value M2 (step S522). Step S522 is performed by the low frequency SNR average value calculation unit 105B. The low frequency SNR average value calculation unit 105B calculates the low frequency SNR average value M2 of only the low frequency band (for example, less than or equal to 500 Hz) and the frequency band where an amplitude of sound signal is larger than an amplitude of the stationary noise model, and passes the calculated low frequency SNR average value M2 to the low SNR voiced state determination unit 105C.

When the low SNR voiced state determination unit 105C receives the entire band SNR average value M1 and the low frequency SNR average value M2, the low SNR voiced state determination unit 105C checks whether M1<TH1 and M2>TH2 (step S523). The first threshold value TH1 to be compared with the entire band SNR average value M1 is set to a value of about 2.0, for example, as described above. Also, the low frequency SNR average value M2 becomes a value higher than the entire band SNR average value M1, and the second threshold value TH2 to be compared with the low frequency SNR average value M2 is set to a value of about 3.0, for example.

If M1≥TH1, the sound signal is not a low SNR. Also, if M2≤TH2, the sound signal is not a voiced state. Thus, if either or both of M1≥TH1 and M2≤TH2 are satisfied (step S523; No), the low SNR voiced state determination unit 105C determines that the sound signal is not in a low SNR voiced state, and notifies the determination result to the suppression range setting unit 106. In this case, the suppression range setting unit 106 sets the phase difference range where the input signal is suppressed to the first phase difference range based on the notified determination result (step S524).

On the other hand, if M1<TH1 and M2>TH2 (step S523; Yes), the low SNR voiced state determination unit 105C determines that the sound signal is in a low SNR voiced state, and notifies the determination result to the suppression range setting unit 106. In this case, the suppression range setting unit 106 sets the phase difference range where the input signal is suppressed to the second phase difference range based on the notified determination result (step S525).

Also, after the suppression range setting unit 106 sets the phase difference range where the input signal is suppressed in step S524 or S525, the suppression range setting unit 106 reads a suppression phase difference range table corresponding to the set phase difference range from the storage unit 110 and passes the table to the suppression coefficient determination unit 107. Thereby, the suppression range setting processing for one frame is terminated (return).

In this manner, in the second embodiment, only when the sound signal to be suppressed is a low SNR and is in a voiced state, the phase difference range where the input signal is not suppressed (the range of setting the suppression coefficient β to 1) is widened, and the phase difference range where the input signal is suppressed is narrowed. That is to say, even when the sound signal to be suppressed is a low SNR, if the sound signal is in a voiceless state, the suppression coefficient determination unit 107 determines the suppression coefficient β based on the same first suppression phase difference range table as that of when the sound signal is a high SNR. Accordingly, it is possible to increase the amount of suppression of noise when the sound signal is a low SNR and is in a voiceless state, and thus uncomfortable feeling, or the like due to large noise is reduced.

On the other hand, if the sound signal to be suppressed is a low SNR and is in a voiced state, the suppression coefficient determination unit 107 determines the suppression coefficient β based on the second suppression phase difference range table in which the phase difference range where the input signal is not suppressed is widened. Accordingly, when the sound signal is a low SNR and in a voiced state, the amount of suppression of the speech sound is reduced, and the speech sound in a low SNR section becomes easy to catch.

[Third Embodiment]

In a third embodiment, a suppression coefficient β is calculated based on the phase difference between the first sound signal and the second sound signal, a suppression coefficient α for the stationary noise is calculated, and a suppression coefficient γ to be applied to a component of the frequency band f is determined based on the suppression coefficients β and α.

Figure 12:
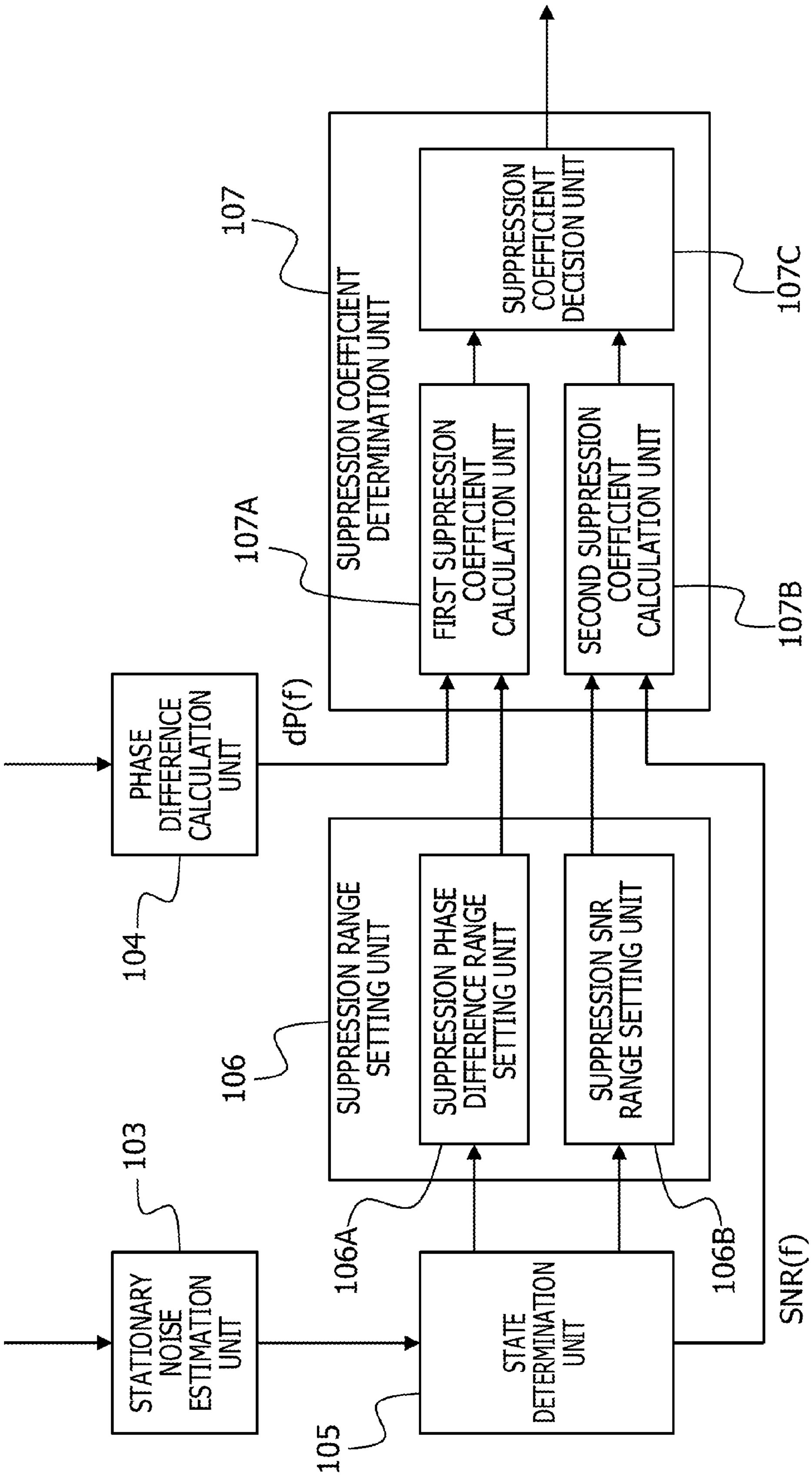
FIG. 12 illustrates a configuration of a suppression range setting unit and a suppression coefficient determination unit in a noise suppression device according to a third embodiment.

FIG. 12 is a block diagram illustrating a configuration of a suppression range setting unit and a suppression coefficient determination unit in a noise suppression device according to the third embodiment.

The functional configuration of the noise suppression device according to the present embodiment is the same as that of the noise suppression device 1 according to the second embodiment with the exception of the suppression range setting unit 106 and the suppression coefficient determination unit 107. That is to say, the state determination unit 105 in the noise suppression device 1 illustrated in FIG. 12 determines whether or not the sound signal to be suppressed is in a low SNR voiced state.

The suppression range setting unit 106 includes a suppression phase difference range setting unit 106A and a suppression SNR range setting unit 106B.

The suppression phase difference range setting unit 106A sets the phase difference range where the input signal is suppressed when suppression by the phase difference is performed based on the determination result of the state determination unit 105. If the determination result is that it is not in a low SNR voiced state, the suppression phase difference range setting unit 106A sets the phase difference range of the first suppression phase difference range table in the phase difference range where the input signal is suppressed. If the determination result is that it is in a low SNR voiced state, the suppression phase difference range setting unit 106A sets the phase difference range of the second suppression phase difference range table in the phase difference range where the input signal is suppressed.

The suppression SNR range setting unit 106B sets the SNR range when stationary noise is suppressed based on the determination result of the state determination unit 105. If the determination result is that it is not in a low SNR voiced state, the suppression SNR range setting unit 106B sets the SNR range of the first suppression SNR range table in the SNR range where the input signal is suppressed. If the determination result is that it is in a low SNR voiced state, the suppression SNR range setting unit 106B sets the SNR range of the second suppression SNR range table in the SNR range where the input signal is suppressed. In this regard, the first and the second suppression SNR range tables are tables representing corresponding relationships between SNRs and suppression coefficients α, respectively. Compared with the first suppression SNR range table, in the second suppression SNR range table, the SNR range where the input signal is not suppressed (the SNR range that causes the suppression coefficient α to "1") is widened so as to narrow the SNR range. The first and second suppression SNR range tables are stored in the storage unit 110.

The suppression coefficient determination unit 107 includes a first suppression coefficient calculation unit 107A, a second suppression coefficient calculation unit 107B, and a suppression coefficient decision unit 107C.

The first suppression coefficient calculation unit 107A calculates a suppression coefficient β(f) in accordance with the phase difference dP(f) for each frequency band f based on the first or the second suppression phase difference range table set by the suppression phase difference range setting unit 106A.

The second suppression coefficient calculation unit 107B calculates a suppression coefficient α(f) in accordance with the SNR(f) for each frequency band f based on the first or the second suppression SNR range tables set by the suppression SNR range setting unit 106B.

The suppression coefficient decision unit 107C decides a suppression coefficient γ(f) to be applied to the signal component (amplitude) of the frequency band f based on the suppression coefficient β(f) calculated by the first suppression coefficient calculation unit 107A and the suppression coefficient α(f) calculated by the second suppression coefficient calculation unit 107B. The suppression coefficient γ(f) to be applied is set to, for example, the product of the suppression coefficients α(f) and β(f). Also, the suppression coefficient γ(f) is set to, for example, a coefficient having a lower value out of the suppression coefficients α(f) and β(f).

Figure 13:
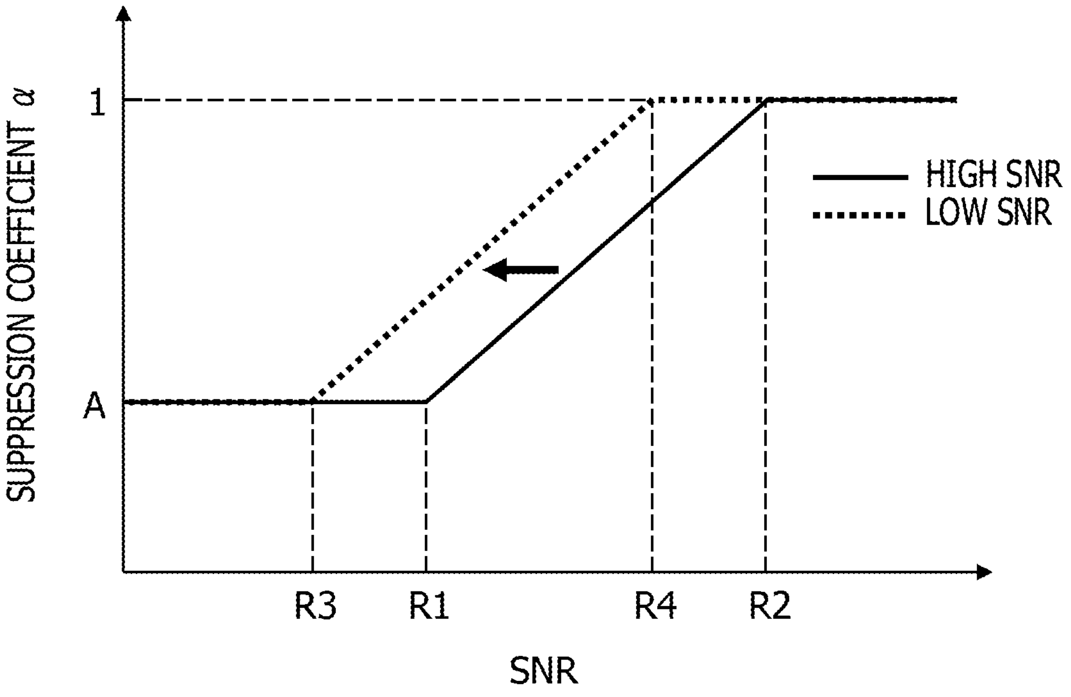
FIG. 13 illustrates a setting example of an SNR range where the input signal is suppressed when stationary noise is suppressed.

FIG. 13 illustrates a setting example of an SNR range where the input signal is suppressed when stationary noise is suppressed.

For the suppression coefficient α when stationary noise is suppressed, for example, as a broken line illustrated by a solid line in FIG. 13, the suppression coefficient α when the SNR is lower than or equal to a first value R1 is set to a minimum value A, and the suppression coefficient α when the SNR is equal to or higher than a second value R2 (>R1) is set to "1". Also, for the suppression coefficient α in a section in which the SNR is a value from the first value R1 to the second value R2, the suppression coefficient α changes in proportion to the SNR value.

If the suppression coefficient α is determined based on the broken line illustrated by the solid line in FIG. 13, the suppression coefficient α(f) for the frequency band f, in which the SNR(f) is lower than the second value R2, becomes a value smaller than 1. Accordingly, if stationary noise is large compared with the sound, and the sound is a low SNR, the sound is suppressed with stationary noise, and it sometimes becomes difficult to catch the sound. Thus, in the present embodiment, the broken line illustrated by the solid line in FIG. 13 is used for determining the suppression coefficient α at the time of high SNR, and a broken line illustrated by a dotted line in FIG. 13 is used for determining the suppression coefficient α at the time of low SNR. The broken line illustrated by the dotted line is produced by performing parallel translation of the broken line by the solid line in the negative direction of SNR. If the suppression coefficient α is determined in accordance with the broken line illustrated by the dotted line, the suppression coefficient α when the SNR is lower than or equal to a third value R3 (<R1) becomes the minimum value A, and the suppression coefficient α when the SNR is equal to or higher than a fourth value R4 (R1<R4<R2) becomes "1". That is to say, the range of the SNR where the input signal is suppressed at the time of the low SNR voiced state is changed from the broken line of the solid line to the broken line of the dotted line so that as the SNR range where the input signal is not suppressed becomes wider, the SNR range where the input signal is suppressed becomes narrower. Thus, if the state determination unit 105 determines that it is in the low SNR voiced state, the suppression coefficient α for each frequency band f is determined in accordance with the broken line illustrated by the dotted line in FIG. 13 so that the amount of suppression of the speech sound is reduced, and thus it becomes easy to catch the speech sound in the output sound.

For the solid broken line (function) to be used for determining the suppression coefficient α at the time of high SNR, illustrated in FIG. 13, the corresponding relationship between the SNR and the suppression coefficient α is put into a tabular form, and stored into the storage unit 110 as the first suppression SNR range table. In the same manner, for the dotted broken line (function) to be used for determining the suppression coefficient α at the time of low SNR, illustrated in FIG. 13, the corresponding relationship between the SNR and the suppression coefficient α is put into a tabular form, and stored into the storage unit 110 as the second suppression SNR range table.

In the same manner as the first embodiment, when the noise suppression device 1 according to the present embodiment starts sound collection by the first microphone 2A and the second microphone 2B, the noise suppression device 1 performs the noise suppression processing as illustrated in FIG. 5. In the noise suppression processing, except for the suppression range setting processing (step S5), which is performed in cooperation with the state determination unit 105 and the suppression range setting unit 106, and the suppression coefficient determination processing (step S6) performed by the suppression coefficient determination unit 107, the processing is the same as that described in the first embodiment.

Figure 14:
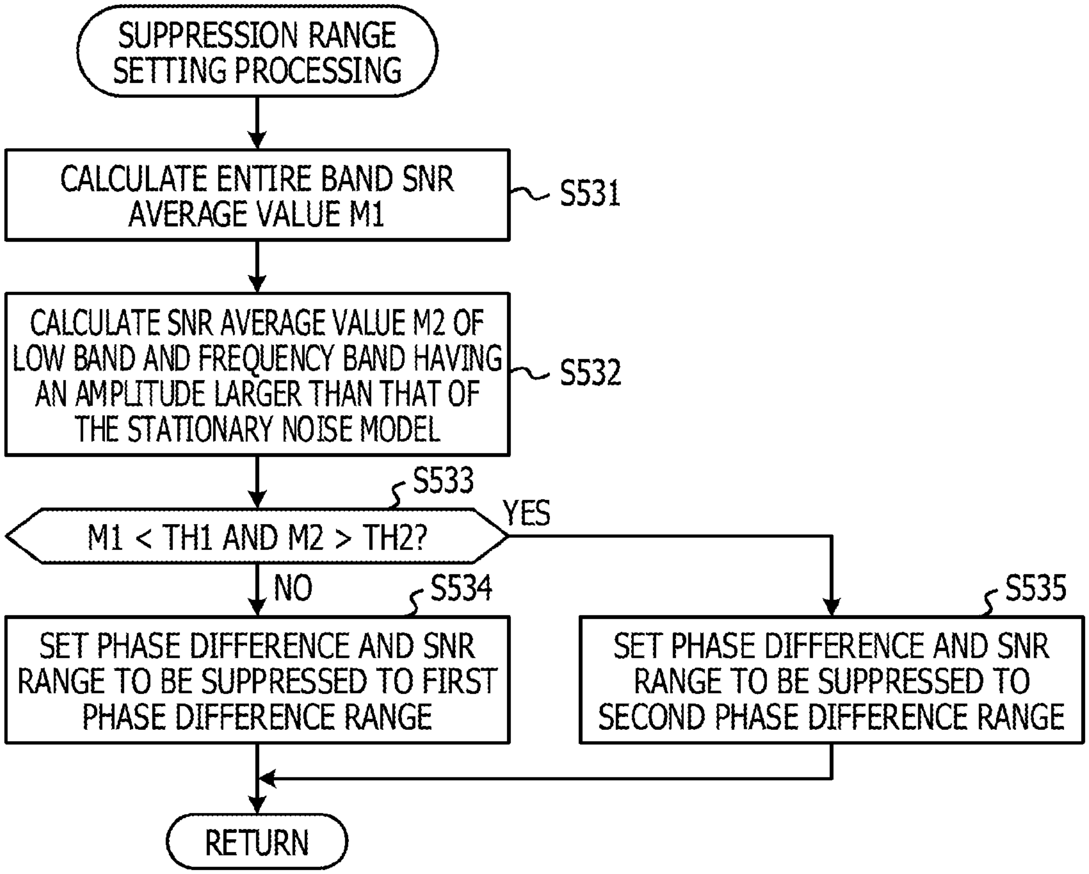
FIG. 14 is a flowchart illustrating contents of suppression range setting processing according to the third embodiment.

FIG. 14 is a flowchart illustrating contents of suppression range setting processing according to the third embodiment.

In the suppression range setting processing in the noise suppression processing according to the present embodiment, as illustrated in FIG. 14, first, the entire band SNR average value M1 is calculated (step S531). Step S531 is performed by the entire band SNR average value calculation unit 105A in the state determination unit 105. The entire band SNR average value calculation unit 105A calculates the entire band SNR average value M1 using the expression (1), and passes the calculated entire band SNR average value M1 to the low SNR voiced state determination unit 105C.

Also, the state determination unit 105 calculates the low frequency SNR average value M2 (step S532). Step S532 is performed by the low frequency SNR average value calculation unit 1056. The low frequency SNR average value calculation unit 105B calculates the average value (low frequency SNR average value M2) of the SNRs of only the frequency band of the low frequency (for example, lower than or equal to 500 Hz) and where an amplitude of the sound signal larger than that of the stationary noise model, and passes the calculated low frequency SNR average value M2 to the low SNR voiced state determination unit 105C.

When the low SNR voiced state determination unit 105C receives the entire band SNR average value M1 and the low frequency SNR average value M2, the low SNR voiced state determination unit 105C checks whether or not M1<TH1 and M2>TH2 (step S533). The first threshold value TH1 and the second threshold value TH2 are a value of about 2.0 and a value of about 3.0, respectively, as described above.

If either or both of M1≥TH1 and M2≤TH2 are satisfied (step S533; No), the low SNR voiced state determination unit 105C determines that the sound signal is not in a low SNR voiced state. In this case, the state determination unit 105 (low SNR voiced state determination unit 105C) notifies the suppression phase difference range setting unit 106A and the suppression SNR range setting unit 106B of the suppression range setting unit 106 that the sound signal is not in the low SNR voiced state. The suppression range setting unit 106 that has received the notification sets the phase difference range and the SNR range where the input signal is suppressed to a first range (step S534). In this regard, the first range is the phase difference range, where the input signal is suppressed, defined by the first suppression phase difference range table and the SNR range, where the input signal is suppressed, defined by the first suppression SNR range table. That is to say, in step S534, the suppression phase difference range setting unit 106A determines the phase difference range where the input signal is suppressed to the phase difference range in the first suppression phase difference range table, and the suppression SNR range setting unit 106B determines the SNR range where the input signal is suppressed to be the SNR range in the first suppression SNR range table.

On the other hand, M1<TH1, and M2>TH2 (step S533; Yes), the low SNR voiced state determination unit 105C determines that the sound signal is in a low SNR voiced state. In this case, the state determination unit 105 (the low SNR voiced state determination unit 105C) notifies the suppression phase difference range setting unit 106A and the suppression SNR range setting unit 106B of the suppression range setting unit 106 of the low SNR voiced state. Then the notified suppression range setting unit 106 sets the phase difference range and the SNR range where the input signal is suppressed to the second range (step S535). In this regard, the second range is the phase difference range, where the input signal is suppressed, defined by the second suppression phase difference range table, and the SNR range, where the input signal is suppressed, defined by the second suppression SNR range table. That is to say, in step S535, the phase difference range suppressed by the suppression phase difference range setting unit 106A is determined to be the phase difference range in the second suppression phase difference range table, and the SNR range suppressed by the suppression SNR range setting unit 106B to be the SNR range in the second suppression SNR range table.

Also, when the suppression phase difference range setting unit 106A sets the phase difference range where the input signal is suppressed in step S534 or S535, the suppression phase difference range setting unit 106A reads the suppression phase difference range table corresponding to the set phase difference range from the storage unit 110 and passes the table to the first suppression coefficient calculation unit 107A. In the same manner, when the suppression SNR range setting unit 106B sets the SNR range where the input signal is suppressed in step S534 or S535, the suppression SNR range setting unit 106B reads the suppression SNR range table corresponding to the set SNR range from the storage unit 110 and passes the table to the second suppression coefficient calculation unit 107B. Thereby, the suppression range setting processing for one frame is terminated (return).

Figure 15:
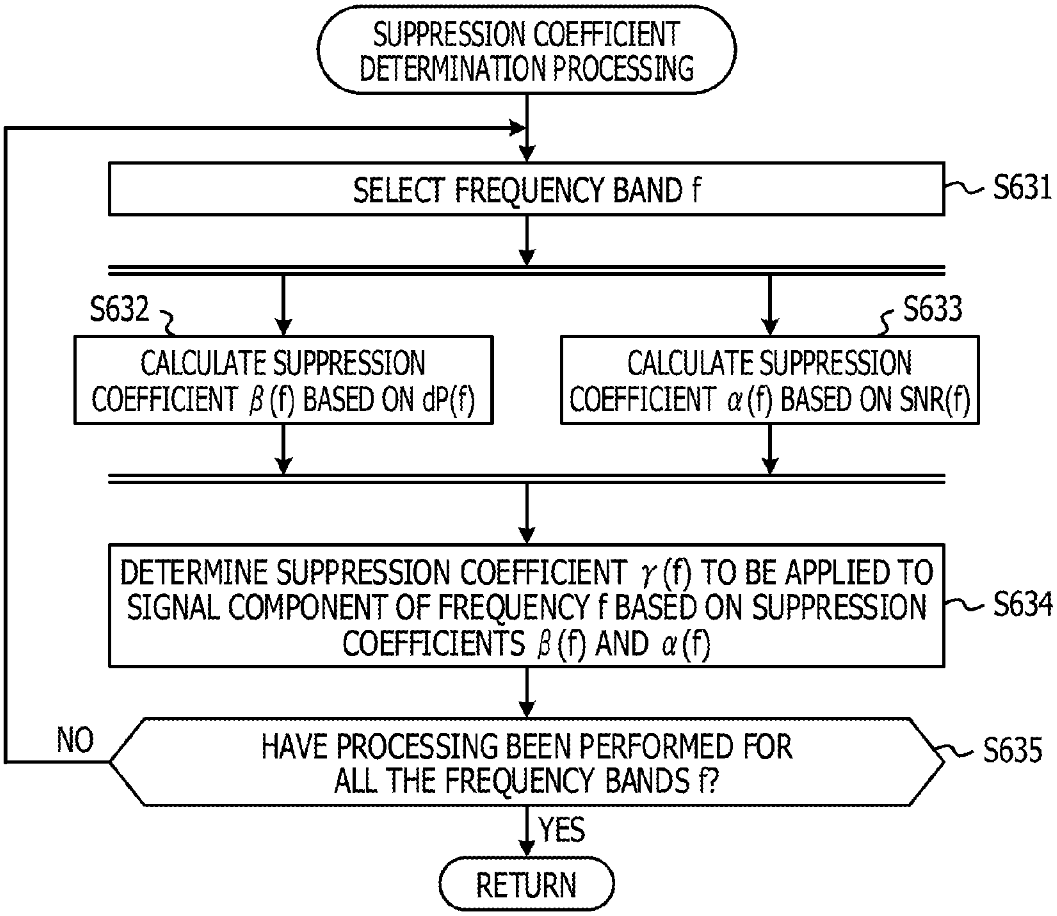
FIG. 15 is a flowchart illustrating contents of suppression coefficient determination processing according to the third embodiment.

FIG. 15 is a flowchart illustrating contents of suppression coefficient determination processing according to the third embodiment.

In the suppression coefficient determination processing in the noise suppression processing according to the present embodiment, as illustrated in FIG. 15, first, a frequency band f is selected (step S631). Step S631 is performed by the first suppression coefficient calculation unit 107A and the second suppression coefficient calculation unit 107B. The first suppression coefficient calculation unit 107A and the second suppression coefficient calculation unit 107B select the same frequency band f.

Next, the first suppression coefficient calculation unit 107A performs processing for calculating the suppression coefficient β based on the phase difference (step S632), and the second suppression coefficient calculation unit 107B performs processing for calculating the suppression coefficient α based on the SNR (step S633). The first suppression coefficient calculation unit 107A performs, for example, the processing of steps S611 to S615, illustrated in FIG. 7 as the processing in step S632. The second suppression coefficient calculation unit 107B performs, for example, processing in which the phase difference in the processing of steps S611 to S615 illustrated in FIG. 7 is replaced by the SNR as the processing of step S633. The first suppression coefficient calculation unit 107A and the second suppression coefficient calculation unit 107B passes each of the calculated suppression coefficients β(f) and α(f) to the suppression coefficient decision unit 107C.

When the suppression coefficient decision unit 107C receives the suppression coefficients β(f) and α(f), the suppression coefficient decision unit 107C determines a suppression coefficient γ(f) to be applied to the component of the frequency band f based on the received suppression coefficients β(f) and α(f) (step S634). In step S634, the suppression coefficient decision unit 107C determines that, for example, $\gamma(f)=\alpha(f)\times\beta(f)$ is the suppression coefficient applied to the signal component of the frequency band f.

After that, the suppression coefficient determination unit 107 checks whether or not the processing for determining a suppression coefficient γ(f) for all the frequency bands f has been completed (step S635). If there is an unprocessed frequency bands f (step S635; No), the suppression coefficient determination unit 107 repeats the processing of steps S631 to S634 on the unprocessed frequency band f. Then if the processing for all the frequency bands f has been completed (step S635; Yes), the suppression coefficient determination unit 107 passes the suppression coefficient γ(f) of each of the decided frequency bands f to the suppression signal generation unit 108 and terminates the suppression coefficient calculation processing (return).

When the suppression signal generation unit 108 receives the suppression coefficient γ(f), the suppression signal generation unit 108 applies the suppression coefficient γ(f) to the signal component of each frequency band f in the first sound signal to generate a suppression signal.

In this manner, in the third embodiment, a suppression coefficient γ(f) to be applied to the component of the frequency band f is decided (determined) based on the suppression coefficient β(f) based on the phase difference and the suppression coefficient α(f) based on the stationary noise. Also, if in a low SNR voiced state, the suppression range setting unit 106 widens the phase difference range where the input signal is not suppressed to calculate a suppression coefficient β(f), and widens the SNR range where the input signal is not suppressed to calculate a suppression coefficient α(f). Accordingly, under an environment having stationary noise, the amount of suppression of the speech sound at the time of a low SNR and in a voiced state is reduced, and thus it becomes easy to catch the speech sound in a low SNR section.

In this regard, the second suppression SNR range table to be used for calculating a suppression coefficient α(f) is not limited to a graph produce by parallel translation of a graph corresponding to the first suppression SNR range table, and may be created based on a graph that narrows the SNR range in which the suppression coefficient α(f) becomes the minimum value.

Figure 16:
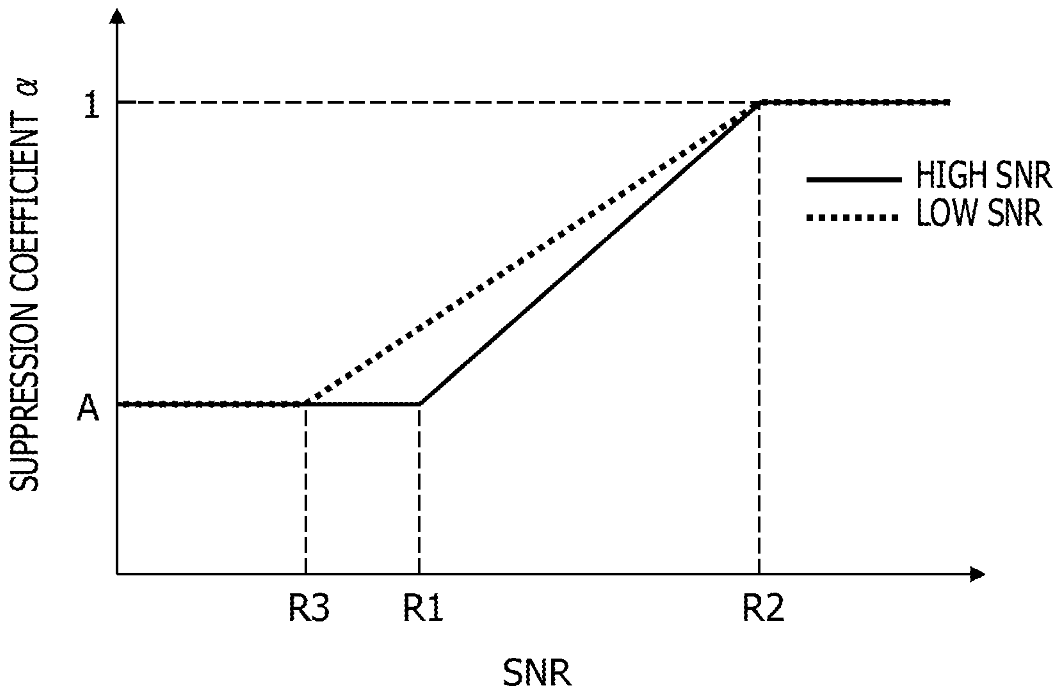
FIG. 16 illustrates another setting example of an SNR range where the input signal is suppressed when stationary noise is suppressed.

FIG. 16 illustrates another setting example of an SNR range where the input signal is suppressed when stationary noise is suppressed.

A broken line illustrated by a solid line in FIG. 16 represents a function to be used for calculating a suppression coefficient α(f) at the time of not in a low SNR voiced state in the same manner as the solid broken line illustrated in FIG. 13. On the other hand, a dotted broken line illustrated in FIG. 16 represents a function to be used for calculating a suppression coefficient α(f) at the time of a low SNR voiced state. In the dotted broken line (function) illustrated in FIG. 16, an upper limit value R3 of the SNR that causes the suppression coefficient α to have a minimum value A is lower than an upper limit value R1 in the case of the solid broken line. On the other hand, in both of the dotted broken line (function) and the solid broken line illustrated in FIG. 16, a lower limit value of the SNR that causes the suppression coefficient α to be "1" is R2. That is to say, the example illustrated in FIG. 16 has an inclined section in which the suppression coefficient α changes in accordance with SNR between the SNR that causes the suppression coefficient α to become the minimum value A and the SNR that causes the suppression coefficient α to become the maximum. Then if the input signal is in a low SNR voiced state, the suppression SNR range setting unit 106B changes the slope of the inclined section such that the SNR range causing the suppression coefficient α to have the minimum value becomes narrower than the range of the case having a predetermined threshold value or higher.

If the second suppression SNR range table is made to correspond to the dotted broken line (function) illustrated in FIG. 16, the SNR range where the input signal is not suppressed is the same in the second suppression SNR range table and in the first suppression SNR range table. However, in the second suppression SNR range table, the range in which the suppression coefficient α(f) is the minimum value A is narrower compared with the first suppression SNR range table. That is to say, when the SNR is a value between the values R3 to R2, the amount of suppression is smaller when suppression is performed based on the second suppression SNR range table compared with the case of suppression based on the first suppression SNR range table. Thus, in the example as illustrated in FIG. 16, the amount of suppression of the speech sound is reduced at the time of low SNR and in a voiced state, and thus it becomes easy to catch the sound in a low SNR section.

Further, the second suppression SNR range table according to the present embodiment is not limited to the dotted broken line (function) illustrated in FIG. 13 and FIG. 16, and may be created based on, for example, a function having different values in R1 to R3 and R2 to R4 in FIG. 13.

[Fourth Embodiment]

In a fourth embodiment, a suppression coefficient β is calculated based on the phase difference between the first sound signal and the second sound signal, a suppression coefficient α for the stationary noise is calculated, and a suppression coefficient γ to be applied to a component of the frequency band f is determined based on the suppression coefficients β and α. Also, in the fourth embodiment, when the suppression coefficient α for the stationary noise is calculated, an SNR range in which suppression by the phase difference is studied is set.

Figure 17:
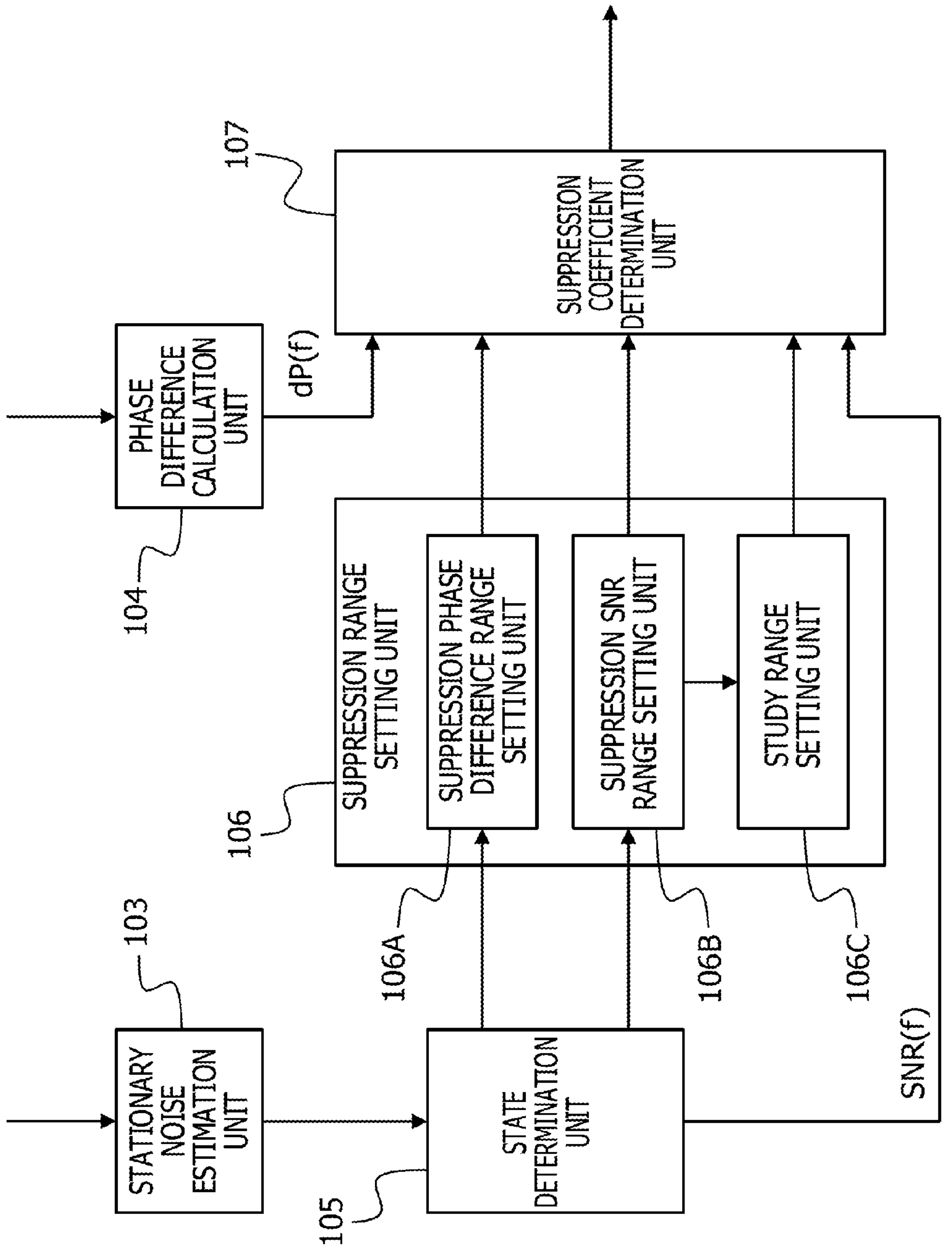
FIG. 17 illustrating a configuration of a suppression range setting unit in a noise suppression device according to a fourth embodiment.

FIG. 17 illustrating a configuration of a suppression range setting unit in a noise suppression device according to the fourth embodiment.

The functional configuration of the noise suppression device according to the present embodiment is the same as that of the noise suppression device 1 according to the second embodiment with the exception of the suppression range setting unit 106 and the suppression coefficient determination unit 107. That is to say, the state determination unit 105 in the noise suppression device 1 illustrated in FIG. 17 determines whether or not the sound signal is in a low SNR voiced state.

The suppression range setting unit 106 includes a suppression phase difference range setting unit 106A, a suppression SNR range setting unit 106B, and a study range setting unit 106C.

The suppression phase difference range setting unit 106A sets the phase difference range where the input signal is suppressed when suppression by the phase difference is performed based on the determination result of the state determination unit 105. If the determination result is that it is not in a low SNR voiced state, the suppression phase difference range setting unit 106A sets the phase difference range of the first suppression phase difference range table in the phase difference range where the input signal is suppressed. If the determination result is that it is in a low SNR voiced state, the suppression phase difference range setting unit 106A sets the phase difference range of the second suppression phase difference range table in the phase difference range where the input signal is suppressed.

The suppression SNR range setting unit 106B sets the SNR range when stationary noise is suppressed based on the determination result of the state determination unit 105. If the determination result is that it is not in a low SNR voiced state, the suppression SNR range setting unit 106B sets the SNR range of the first suppression SNR range table in the SNR range where the input signal is suppressed. If the determination result is that it is in a low SNR voiced state, the suppression SNR range setting unit 106B sets the SNR range of the second suppression SNR range table to the SNR range where the input signal is suppressed.

The study range setting unit 106C sets a range for studying suppression by the phase difference in the suppression SNR range set by the suppression SNR range setting unit 106B.

The suppression coefficient determination unit 107 determines a suppression coefficient to be applied to the component of each frequency band f based on the suppression SNR range set by the suppression range setting unit 106, the range for studying suppression by the phase difference, and the suppression phase difference range.

Figure 18:
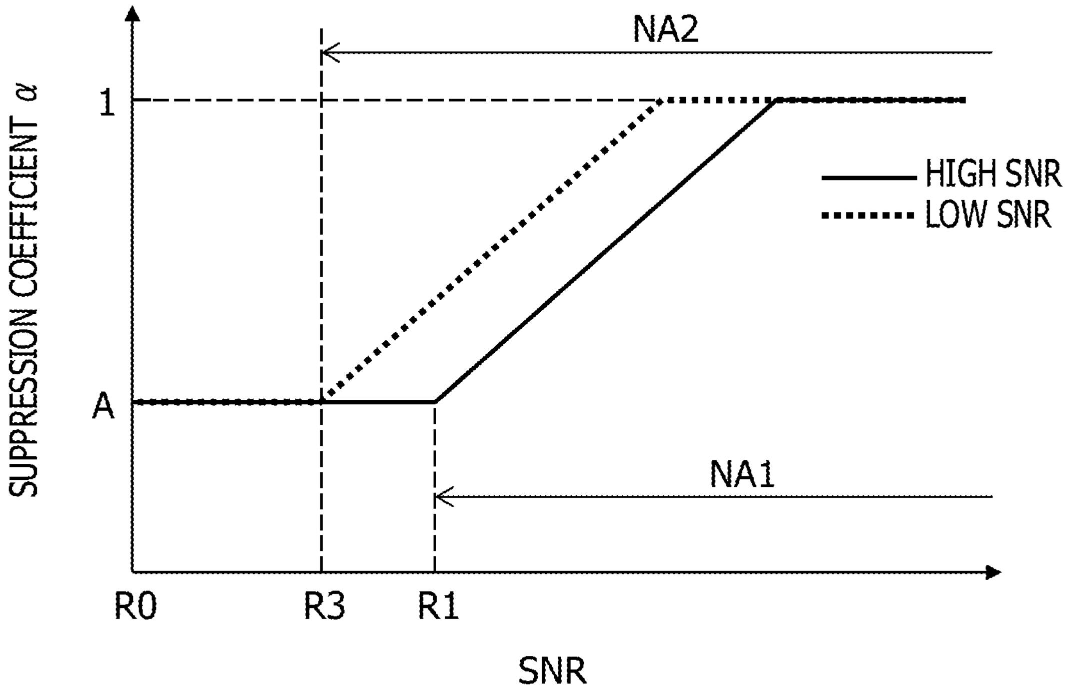
FIG. 18 illustrates a setting example of a range for which suppression by phase difference is to be studied.

FIG. 18 illustrates a setting example of a range for which suppression by phase difference is to be studied.

In the present embodiment, two kinds of suppression SNR ranges for stationary noise are provided, for example, a first suppression SNR range corresponding to a broken line illustrated by a solid line in FIG. 18 and a second suppression SNR range corresponding to a broken line illustrated by a dotted line.

Also, in the present embodiment, the ranges for studying suppression by the phase difference are set to the first suppression SNR range and the second suppression SNR range, respectively. For example, in the example illustrated in FIG. 18, SNR ranges NA1 and NA2, in which the suppression coefficient α does not become the minimum value A in each suppression SNR range, are set to the ranges for studying the respective phase differences. The ranges NA1 and NA2 in which suppression by the phase difference is studied are ranges in which calculation of the suppression coefficient β(f) is studied based on the first suppression phase difference range or the second suppression phase difference range. If the sound signal where the input signal is suppressed is not in a low SNR voiced state, in the example illustrated in FIG. 18, for the signal component of the frequency band f having the SNR(f) higher than a value R1, the suppression coefficient α(f) and the suppression coefficient β(f) by the phase difference are calculated. Then for the signal component of the frequency band f having SNR(f) lower than the value R1, only the suppression coefficient α(f) is calculated, and suppression coefficient β(f) is not calculated. Also, in the example illustrated in FIG. 18, if the sound signal to be suppressed is in a low SNR voiced state, for the signal component of the frequency band f having SNR(f) higher than a value R3, the suppression coefficient α(f) and the suppression coefficient β(f) by the phase difference are calculated. Then for the signal component of the frequency band f having SNR(f) lower than the value R3, only the suppression coefficient α(f) is calculated, and the suppression coefficient β(f) is not calculated.

In the same manner as the first embodiment, when the noise suppression device 1 according to the present embodiment starts sound collection by the first microphone 2A and the second microphone 2B, the noise suppression device 1 performs the noise suppression processing as illustrated in FIG. 5. In the noise suppression processing, except for the suppression range setting processing (step S5), which is performed in cooperation with the state determination unit 105 and the suppression range setting unit 106, and the suppression coefficient determination processing (step S6) performed by the suppression coefficient determination unit 107, the processing is the same as that described in the first embodiment.

Figure 19:
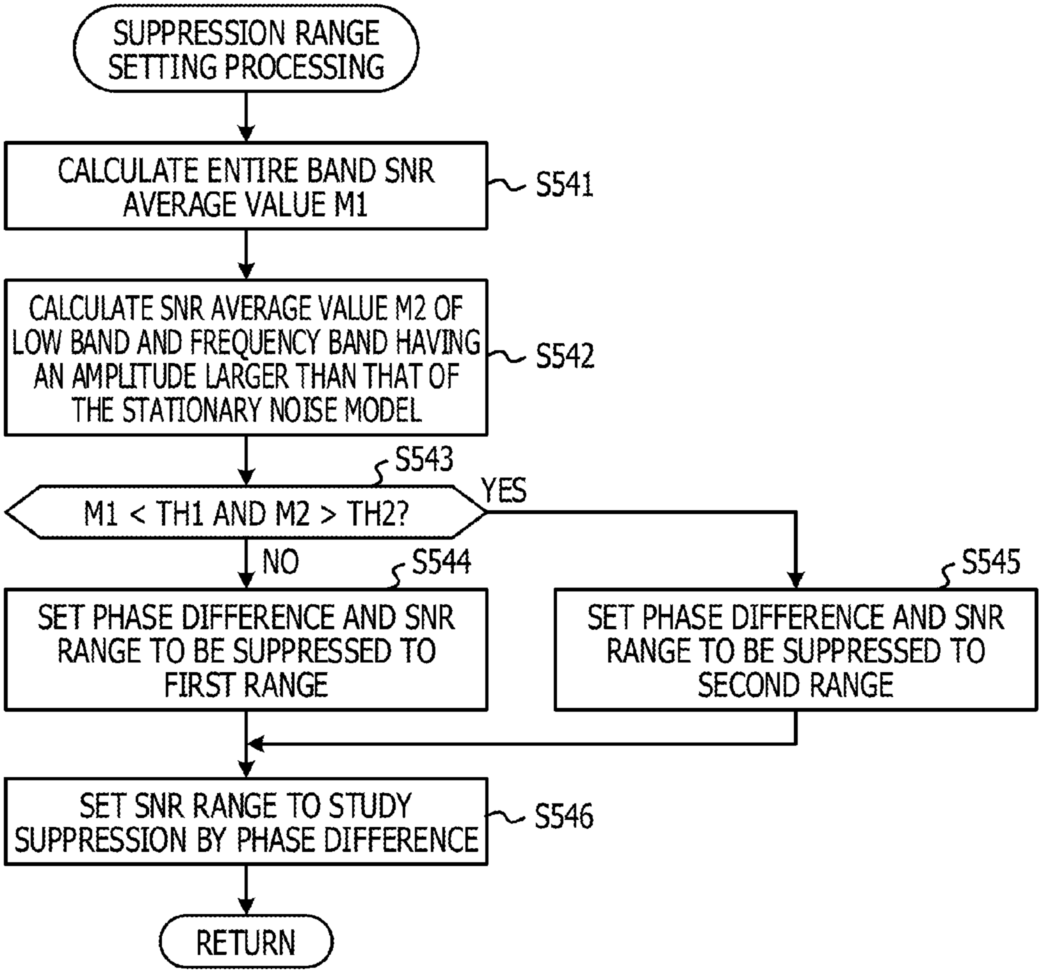
FIG. 19 is a flowchart illustrating contents of suppression range setting processing according to a fourth embodiment.

FIG. 19 is a flowchart illustrating contents of suppression range setting processing according to a fourth embodiment.

In the suppression range setting processing in the noise suppression processing according to the present embodiment, as illustrated in FIG. 19, first, the entire band SNR average value M1 is calculated (step S541). Step S541 is performed by the entire band SNR average value calculation unit 105A in the state determination unit 105. The entire band SNR average value calculation unit 105A calculates the entire band SNR average value M1 using the expression (1) and passes the calculated entire band SNR average value M1 to the low SNR voiced state determination unit 105C.

Also, the state determination unit 105 calculates a low frequency SNR average value M2 (step S542). Step S542 is performed by the low frequency SNR average value calculation unit 105B. The low frequency SNR average value calculation unit 105B calculates the average value (the low frequency SNR average value M2) of the SNRs of only a low frequency (for example, lower than or equal to 500 Hz) and the frequency band where an amplitude of the sound signal larger than that of the stationary noise model, and passes the calculated low frequency SNR average value M2 to the low SNR voiced state determination unit 105C.

When the low SNR voiced state determination unit 105C receives the entire band SNR average value M1 and the low frequency SNR average value M2, the low SNR voiced state determination unit 105C checks whether M1<TH1 and M2>TH2 (step S543). The first threshold value TH1 and the second threshold value TH2 are assumed to be values of about 2.0 and about 3.0, respectively, as described above.

If either or both of M1≥TH1 and M2≤TH2 are satisfied (step S543; No), the low SNR voiced state determination unit 105C determines that the sound signal is not in a low SNR voiced state. In this case, the state determination unit 105 (low SNR voiced state determination unit 105C) notifies the suppression phase difference range setting unit 106A and the suppression SNR range setting unit 106B in suppression range setting unit 106 that the sound signal is not in a low SNR voiced state. The notified suppression range setting unit 106 sets the phase difference range where the input signal is suppressed and the SNR range to the first range (step S544). In step S544, the suppression phase difference range setting unit 106A sets the phase difference range to the phase difference range where the input signal is suppressed in the first suppression phase difference range table, and the suppression SNR range setting unit 106B sets the SNR range where the input signal is suppressed to the SNR range in the first suppression SNR range table.

On the other hand, if M1<TH1 and M2>TH2 (step S543; Yes), the low SNR voiced state determination unit 105C determines that the sound signal is in a low SNR voiced state. In this case, the state determination unit 105 (low SNR voiced state determination unit 105C) notifies the suppression phase difference range setting unit 106A and the suppression SNR range setting unit 106B in the suppression range setting unit 106 that that the sound signal is the low SNR voiced state. The notified suppression range setting unit 106 sets the phase difference range where the input signal is suppressed and the SNR range to the second range (step S545). In the processing in step S545, the suppression phase difference range setting unit 106A sets the phase difference range to the phase difference range in the second suppression phase difference range table, and the suppression SNR range setting unit 106B sets the SNR range where the input signal is suppressed to the SNR range of the second suppression SNR range table.

Also, after the suppression phase difference range setting unit 106A sets the phase difference range where the input signal is suppressed in step S544 or S545, the suppression phase difference range setting unit 106A reads a suppression phase difference range table corresponding to the set phase difference range from the storage unit 110 and passes the table to the suppression coefficient determination unit 107. In the same manner, after the suppression SNR range setting unit 106B sets the SNR range where the input signal is suppressed in step S544 or S545, the suppression SNR range setting unit 106B reads a suppression SNR range table corresponding to the set SNR range from the storage unit 110, and passes the table to the suppression coefficient determination unit 107. Further, after the suppression SNR range setting unit 106B determines the SNR range where the input signal is suppressed in step S544 or S545, the suppression SNR range setting unit 106B notifies the determined SNR range to the study range setting unit. When the study range setting unit 106C receives the notification of the SNR range where the input signal is suppressed, the study range setting unit 106C sets the SNR range to be studied for suppression by the phase difference based on the notified SNR range (step S546). The study range setting unit 106C notifies the SNR range to be studied for suppression by the set phase difference to the suppression coefficient determination unit 107. Thereby, the suppression range setting processing for one frame is terminated (return).

Figure 20:
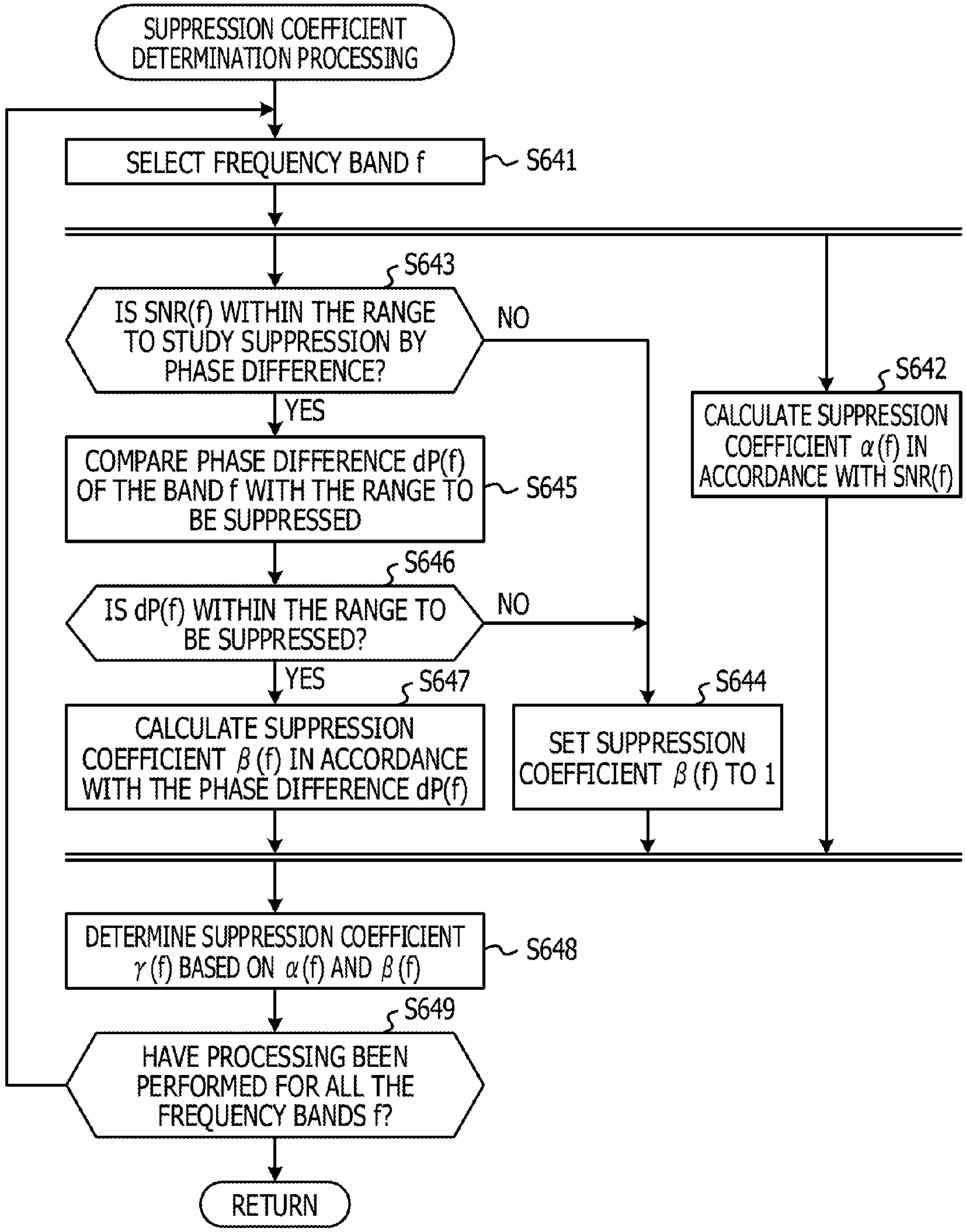
FIG. 20 is a flowchart illustrating contents of suppression coefficient determination processing according to the fourth embodiment.

FIG. 20 is a flowchart illustrating contents of suppression coefficient determination processing according to the fourth embodiment.

In the suppression coefficient determination processing in the noise suppression processing according to the present embodiment, as illustrated in FIG. 20, the suppression coefficient determination unit 107 first selects a frequency band f (step S641).

Next, the suppression coefficient determination unit 107 calculates a suppression coefficient α(f) corresponding to the SNR(f) (step S642).

Also, the suppression coefficient determination unit 107 checks whether or not the SNR(f) is within the range to be studied for suppression by the phase difference in parallel with the processing of step S642 (step S643). If the SNR(f) is not within the range to be studied for suppression by the phase difference (step S643; No), the suppression coefficient determination unit 107 sets the suppression coefficient β(f) based on the phase difference to 1 (step S644).

On the other hand, if the SNR(f) is within the range to be studied for suppression by the phase difference (step S643; Yes), the suppression coefficient determination unit 107 next compares the phase difference dP(f) of the frequency band f with the phase difference range where the input signal is suppressed (step S645).

Next, the suppression coefficient determination unit 107 checks whether or not the phase difference dP(f) is within a range in which suppression by the phase difference is to be performed (step S646). The suppression coefficient determination unit 107 refers to the first suppression phase difference range set by the suppression phase difference range setting unit 106A or the second suppression phase difference range, and determines whether or not the phase difference dP(f) is a range where the input signal is suppressed.

If the phase difference dP(f) is within the range where the input signal is suppressed (step S646; Yes), the suppression coefficient determination unit 107 calculates a suppression coefficient β(f) in accordance with the phase difference dP(f) (step S647). On the other hand, if the phase difference dP(f) is out of the range where the input signal is suppressed (step S645; No), the suppression coefficient determination unit 107 sets the suppression coefficient β(f) to 1 (step S644).

After that, the suppression coefficient determination unit 107 determines a suppression coefficient γ(f) to be applied to the component of the frequency band f based on the suppression coefficient α(f) calculated in step S642 and the suppression coefficient β(f) calculated in step S644 or S647 (step S648). In step S648, the suppression coefficient determination unit 107 determines, for example, γ(f)=α(f)×β(f) to be a suppression coefficient to be applied to the signal component of the frequency band f.

When the suppression coefficient γ(f) to be applied to the component of the frequency band f is determined in step S648, the suppression coefficient determination unit 107 next checks whether or not the processing has been performed for all the frequency bands f (step S649). If there is a frequency band for which processing has not been performed (step S649; No), the suppression coefficient determination unit 107 performs the processing of step S641 and after that for the frequency band f that has not been processed. If the processing for all the frequency bands is performed (step S649; Yes), the suppression coefficient determination unit 107 passes the suppression coefficient γ(f) to be applied for each frequency band f to the suppression signal generation unit 108, and the suppression coefficient determination processing for one frame is terminated (return).

In the present embodiment, when a suppression SNR range for the stationary noise is set, an SNR range higher than a predetermined SNR is set to the SNR range to be studied for suppression by the phase difference. That is to say, if the SNR is high and the stationary noise is low, suppression by the phase difference is studied in addition to suppression by the SNR. Thus if the stationary noise is small, but non-stationary noise is included in the sound signal, non-stationary noise is suppressed by suppression by the phase difference.

In this regard, in the present embodiment, if the suppression coefficient γ(f) to be applied to the component of the frequency band f is determined from the suppression coefficients α(f) and β(f), in place of using γ(f) =α(f)×β(f), for example, a smaller one of α(f) and β(f) may be used as the suppression coefficient γ(f).

It is possible to achieve the noise suppression device 1 according to the first to the fourth embodiments described above by a computer and a program for causing the computer to execute the above-described noise suppression processing. In the following, a description will be given of the noise suppression device 1 that is achieved by the computer and the program with reference to FIG. 21.

Figure 21:
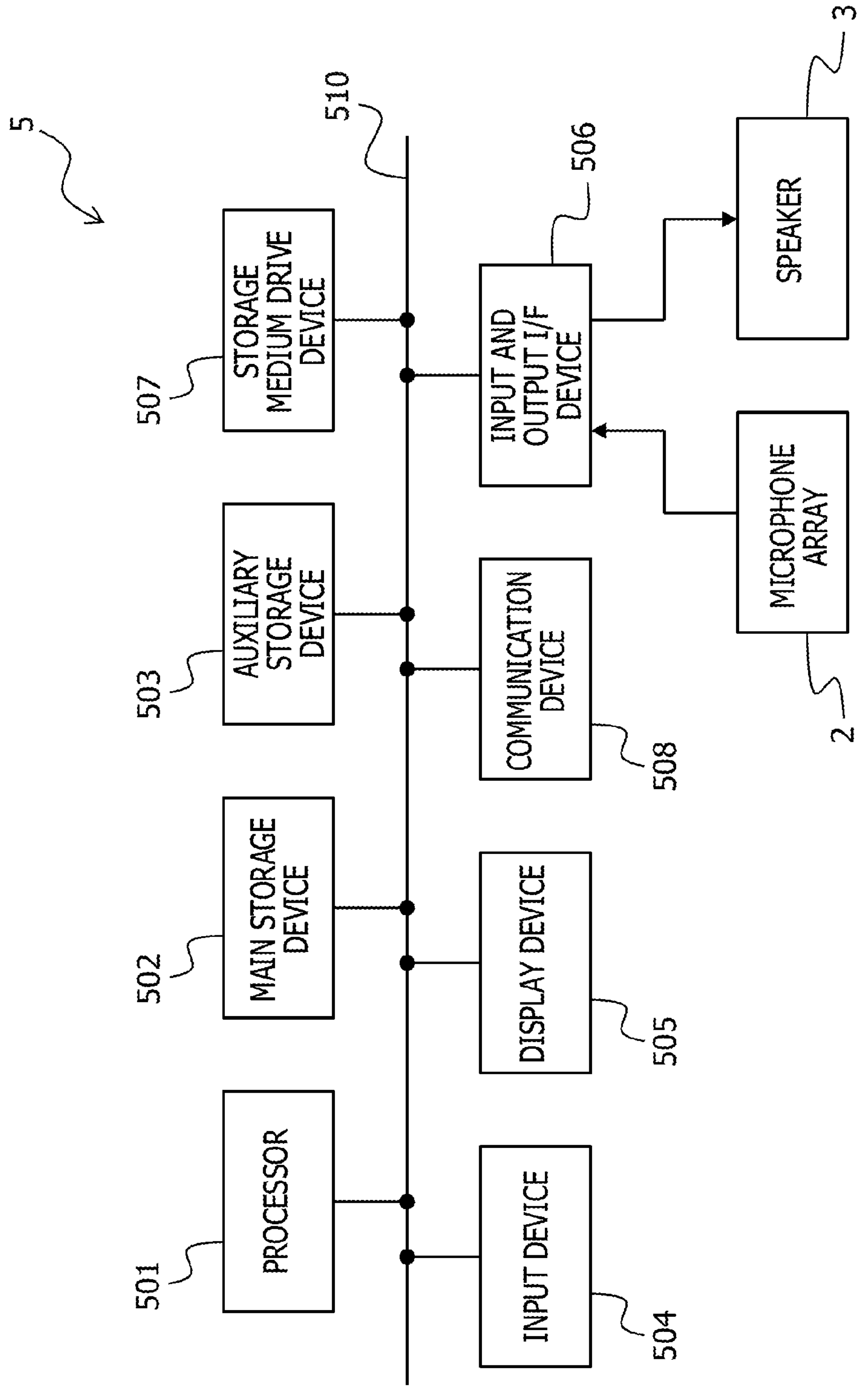
FIG. 21 is a hardware configuration diagram of a computer.

FIG. 21 is a hardware configuration diagram of a computer.

As illustrated in FIG. 21, a computer 5 operated as the noise suppression device 1 included a processor 501, a main storage device 502, an auxiliary storage device 503, an input device 504, and a display device 505. Also, the computer 5 includes an input and output I/F device 506, a storage medium drive device 507, and a communication device 508. These elements 501 to 508 in the computer 5 are mutually coupled via a bus 510, and data transfer is possible among the elements.

The processor 501 is an arithmetic processing unit, such as a central processing unit (CPU), a micro processing unit (MPU), or the like. The processor 501 executes various programs including an operating system so as to control the overall operation of the computer 5.

The main storage device 502 includes a read only memory (ROM) and a random access memory (RAM). In the ROM, for example, a predetermined basic control program that is read by the processor 501 at the time of starting the computer 5, or the like is recorded. Also, the RAM is used as a working storage area as demanded when the processor 501 executes the various programs. In the noise suppression device 1, the RAM of the main storage device 502 may be used for temporarily storing, for example the suppression phase difference range table, the suppression SNR range table, the suppression signal, and the like.

The auxiliary storage device 503 is a storage device having a large capacity compared with the main storage device 502, such as a hard disk drive (HDD), a solid state drive (SSD), or the like. The auxiliary storage device 503 stores the various programs that are executed by the processor 501, various kinds of data, or the like. The programs that are stored in the auxiliary storage device 503 include, for example, a program of the sound input and output processing including the above-described noise suppression processing, and the like.

The input device 504 is, for example, a keyboard device or a mouse device, and when the input device 504 is operated by an operator of the computer 5, the input device 504 transmits input information associated with the operation contents to the processor 501.

The display device 505 is, for example, a display device, such as a liquid crystal display, or the like. The liquid crystal display displays various texts, images, or the like in accordance with the display data transmitted from the processor 501, or the like.

The input and output I/F device 506 is an interface device for coupling various external devices, such as a microphone array 2, a speaker 3, or the like to the computer 5 in order to enable the devices.

The storage medium drive device 507 reads a program and data that are stored in a portable storage medium not illustrated in the figure, and writes the data, or the like stored in the auxiliary storage device 503 into the portable storage medium. As a portable storage medium, for example, it is possible to use a flash memory provided with a USB standard connector. Also, as a portable storage medium, it is possible to use an optical disc, such as a compact disk (CD), a digital versatile disc (DVD), a Blu-ray Disc (Blu-ray is a registered trademark), or the like.

The communication device 508 is a device that couples, for example, the computer 5 and a communication network, such as the Internet, or the like in a communicable manner, and that performs communication with external communication devices, or the like via a communication network. Also, the communication device 508 may be a device that performs telephone calls and communication via a telephone network, such as a mobile phone line, or the like, for example.

In the computer 5, the processor 501 reads a program including the above-described noise suppression processing from the auxiliary storage device 503, or the like, and executes the program so as to suppress noise in the input signal input from the microphone array 2. Also, an output sound signal, from which noise is suppressed, may be output from the speaker 3, for example. Also, if the computer 5 is capable of telephone conversation, such as a mobile phone terminal, a smartphone, or the like, the output sound signal may be transmitted to a terminal of the other party on the phone via the communication device 508.

Also, the computer 5 may be, for example, a car navigation system, or the like. In this case, a program for executing the above-described noise suppression processing may be, for example, combined with a speech recognition program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A noise suppression device comprising:

a memory; and a processor coupled to the memory and configured to generate a first input signal and a second input signal by converting a first sound signal and a second sound signal from time domain to frequency domain, the first sound signal and the second sound signal being collected by a first microphone and a second microphone, respectively, based on the first input signal and the second input signal, determine a stationary noise model, calculate a signal to noise ratio (SNR) based on the first input signal and the stationary noise model, based on the SNR, set a range of phase difference to suppress the first input signal so that the range of phase difference to suppress the first input signal under a condition that the SNR is lower than a first value is set narrower than the range of phase difference under a condition that the SNR is higher than the first value, calculate a phase difference between the first input signal and the second input signal, and when the phase difference is within the range of phase difference, suppress the first input signal.

2. The noise suppression device according to claim 1, wherein the processor is further configured to determine whether the SNR of the first input signal is lower than the first value, and whether the first input signal is in a voiced state including a voice, and when the SNR of the first input signal is lower than the first value, and the first input signal is in the voiced state, the range of phase difference to suppress the first input signal is set narrower than the range of phase difference when the signal to noise ratio is equal to or higher than the first value.

3. The noise suppression device according to claim 2, wherein the processor is further configured to calculate a first average value of the SNR in whole frequency band of the first input signal, calculate a second average value of the SNR in a frequency band lower than a certain frequency, and having an amplitude of the first input signal larger than an amplitude of the stationary noise model, and when the first average value is lower than a second value, and the second average value is higher than a third value, determine that the SNR of the first input signal is lower than the first value and the first input signal is in the voiced state.

4. The noise suppression device according to claim 1, wherein the processor is further configured to set a range of the SNR to suppress the first input signal.

5. The noise suppression device according to claim 4, wherein the processor is further configured to based on at least one of the range of phase difference to suppress the first input signal and the range of SNR to suppress the first input signal, determine a suppression coefficient to be applied to a signal component of each frequency band of the first input signal.

6. The noise suppression device according to claim 4, wherein the processor is further configured to calculate a first suppression coefficient in accordance with a signal component of each frequency band of the first input signal based on the range of the phase difference to suppress the first input signal, calculate a second suppression coefficient in accordance with a signal component of each frequency band of the second input signal based on the range of the SNR to suppress the second input signal, and determine a suppression coefficient to be applied to a signal component of each frequency band of the first input signal based on the first suppression coefficient and the second suppression coefficient.

7. The noise suppression device according to claim 4, wherein the processor is further configured to set a range to study whether to perform suppression based on the phase difference on a signal component of each frequency band in the range of the SNR to suppress the first input signal.

8. The noise suppression device according to claim 4, wherein the processor is further configured to when the SNR of the first input signal is lower than a fourth value, and the first input signal is in a voiced state, perform parallel translation of the range of the SNR to suppress the first input signal so that the SNR of the first input signal becomes narrower than a range when the SNR of the first input signal is equal to or higher than the fourth value.

9. The noise suppression device according to claim 4, wherein when the SNR of the first input signal is lower than a fifth value, and the first input signal is in a voiced state, a maximum value of a signal to noise ratio corresponding to a minimum value of a suppression coefficient is set to a lower limit.

10. The noise suppression device according to claim 1, wherein the first input signal includes a voice element, and when the SNR is lower than the first value, a degree of suppression of the voice element is reduced compared to when the SNR is higher than the first value.

11. A method of noise suppression, comprising:

generating a first input signal and a second input signal by converting a first sound signal and a second sound signal from time domain to frequency domain, the first sound signal and the second sound signal being collected by a first microphone and a second microphone, respectively;

based on the first input signal and the second input signal, determining a stationary noise model;

calculating a signal to noise ratio (SNR) based on the first input signal and the stationary noise model;

based on the SNR, setting a range of phase difference to suppress the first input signal so that the range of phase difference to suppress the first input signal under a condition that the SNR is lower than a first value is set narrower than the range of phase difference under a condition that the SNR is higher than the first value;

calculating a phase difference between the first input signal and the second input signal; and when the phase difference is within the range of phase difference, suppressing the first input signal.

12. The method according to claim 11, further comprising:

determining whether the SNR of the first input signal is lower than the first value, and whether the first input signal is in a voiced state including a voice, wherein when the SNR of the first input signal is lower than the first value, and the first input signal is in the voiced state, the range of phase difference to suppress the first input signal is set narrower than the range of phase difference when the signal to noise ratio is equal to or higher than the first value.

13. The method according to claim 12, further comprising:

calculating a first average value of the SNR in whole frequency band of the first input signal;

calculating a second average value of the SNR in a frequency band lower than a certain frequency, and having an amplitude of the input signal larger than an amplitude of the stationary noise model; and when the first average value is lower than a second value, and the second average value is higher than a third value, determining that the SNR of the first input signal is lower than the first value and the first input signal is in the voiced state.

14. The method according to claim 11, further comprising:

setting a range of the SNR to suppress the first input signal.

15. The method according to claim 14, further comprising:

based on at least one of the range of phase difference to suppress the first input signal and the range of SNR to suppress the first input signal, determining a suppression coefficient to be applied to a signal component of each frequency band of the first input signal.

16. The method according to claim 14, further comprising:

calculating a first suppression coefficient in accordance with a signal component of each frequency band of the first input signal based on the range of the phase difference to suppress the first input signal;

calculating a second suppression coefficient in accordance with a signal component of each frequency band of the second input signal based on the range of the SNR to suppress the second input signal; and determining a suppression coefficient to be applied to a signal component of each frequency band of the first input signal based on the first suppression coefficient and the second suppression coefficient.

17. The method according to claim 14, further comprising:

setting a range to study whether to perform suppression based on the phase difference on a signal component of each frequency band in a range of the SNR to suppress the first input signal.

18. A noise suppression device comprising:

a memory; and a processor coupled to the memory and configured to determine a stationary noise model based on a first input signal and second input signal, each of the first input signal and the second input signal being a frequency domain signal obtained by converting sound collected from a microphone array, calculate a signal to noise ratio (SNR) based on the first input signal and the stationary noise model, determine a state of the first input signal based on the SNR, calculate a phase difference between the first input signal and the second input signal, determine a range of phase difference to suppress the first input signal based on the determined state, and suppress the first input signal when the calculated phase difference is within the range to improve sound signal detection when the sound signal collected by the microphone array is larger than a sound threshold and the SNR of the first input signal lower a SNR threshold.

* * * * *